US012569842B2

(12) United States Patent　　(10) Patent No.:　US 12,569,842 B2

Malick et al.　　(45) Date of Patent:　Mar. 10, 2026

(54) INCORPORATION OF BORON IN HYDROPROCESSING CATALYSTS, CATALYSTS OBTAINED AND USE THEREOF

(71) Applicant: Advanced Refining Technologies LLC, Columbia, MD (US)

(72) Inventors: Gill M. Malick, Orland Park, IL (US); Michael J. Manto, Tinley Park, IL (US); John R. Derrig, Downers Grove, IL (US)

(73) Assignee: Advanced Refining Technologies LLC, Columbia, MD (US)

( * ) Notice: Subject to any disclaimer, the term of this patent is extended or adjusted under 35 U.S.C. 154(b) by 567 days.

(21) Appl. No.: 18/042,897

(22) PCT Filed: Aug. 25, 2021

(86) PCT No.: PCT/US2021/071273

§ 371 (c)(1),
(2) Date: Feb. 24, 2023

(87) PCT Pub. No.: WO2022/047475

PCT Pub. Date: Mar. 3, 2022

(65) Prior Publication Data

US 2023/0347331 A1　　Nov. 2, 2023

Related U.S. Application Data

(60) Provisional application No. 63/070,552, filed on Aug. 26, 2020.

(51) Int. Cl.
B01J 37/02　　(2006.01)
B01J 6/00　　(2006.01)
(Continued)

(52) U.S. Cl.
CPC ........... B01J 37/0213 (2013.01); B01J 6/001 (2013.01); B01J 21/02 (2013.01); B01J 21/04 (2013.01);
(Continued)

(58) Field of Classification Search
CPC ... B01J 6/001; B01J 21/02; B01J 21/04; B01J 21/12; B01J 23/882; B01J 23/883;
(Continued)

(56) References Cited

U.S. PATENT DOCUMENTS 3,998,721 A　　12/1976　O'Hara
4,724,226 A　　2/1988　Cheng et al.
(Continued)

FOREIGN PATENT DOCUMENTS

CN　　101695663　　4/2010
CN　　101927191 A　　12/2010
(Continued)

OTHER PUBLICATIONS

International Search Report and Written Opinion for PCT/US21/71273 dated Feb. 17, 2022, 21 pages.
(Continued)

*Primary Examiner* — Brian A Mccaig

(74) *Attorney, Agent, or Firm* — DORITY & MANNING, P.A.

(57)　　　ABSTRACT

A method of producing a support, and supported catalyst, the method comprising: (a) combining a porous inorganic oxide catalyst carrier or carrier extrudate with an aqueous solution, dispersion or suspension comprising: (i) a boron-containing source; and (ii) an organic compound or organic chelating agent selected from organic compounds comprising at least two oxygen atoms and 2-10 carbon atoms; (b) calcining the composition (a) to reduce its Loss on Ignition (LOI) volatiles content to greater than 0 wt % to less than about 5 wt (Continued)

%; (c) impregnating the calcined composition an aqueous composition comprising at least one each of a Group VIB and Group VIIIB metal-containing source; and (d) calcining, to reduce its LOI volatiles content greater than 0 wt % to less than about 30 wt %; wherein the boron content of a supported catalyst is in the range of about 1 wt % to about 13 wt $B_2O_3$ based on the total weight of the catalyst.

20 Claims, 15 Drawing Sheets

(51) Int. Cl.

| | |
|---|---|
| *B01J 21/02* | (2006.01) |
| *B01J 21/04* | (2006.01) |
| *B01J 35/30* | (2024.01) |
| *B01J 35/50* | (2024.01) |
| *B01J 37/00* | (2006.01) |

(52) U.S. Cl.
CPC .............. *B01J 35/30* (2024.01); *B01J 35/50* (2024.01); *B01J 37/0009* (2013.01); *B01J 37/0203* (2013.01); *B01J 37/0236* (2013.01); *B01J 2235/00* (2024.01)

(58) Field of Classification Search
CPC . B01J 31/04; B01J 35/30; B01J 35/615; B01J 35/635; B01J 37/0009; B01J 37/0018; B01J 37/0203; B01J 37/0205; B01J 37/0207; B01J 37/0213; B01J 37/0236; B01J 37/28
See application file for complete search history.

(56) References Cited

U.S. PATENT DOCUMENTS

| | | | |
|---|---|---|---|
| 5,609,750 | A | 3/1997 | Nat et al. |
| 6,174,432 | B1 | 1/2001 | Mizutai et al. |
| 6,309,537 | B1 | 10/2001 | Harle et al. |
| 7,713,903 | B2 | 5/2010 | Lockemeyer et al. |
| 8,465,714 | B2 | 6/2013 | Augustine et al. |
| 8,758,596 | B2 | 6/2014 | Hayasaka et al. |
| 8,791,280 | B2 | 7/2014 | Rizkalla |
| 8,962,514 | B2 | 2/2015 | Seki et al. |
| 9,511,359 | B2 | 12/2016 | Cheung et al. |
| 10,046,974 | B2 | 8/2018 | Parvulescu et al. |
| 11,318,453 | B2 | 5/2022 | Jansen et al. |
| 2004/0050754 | A1 | 3/2004 | Abe et al. |
| 2006/0234857 | A1 | 10/2006 | Jayaratne et al. |
| 2012/0037540 | A1 | 2/2012 | Jansen et al. |
| 2013/0131399 | A1 | 5/2013 | Weiner et al. |
| 2013/0225876 | A1 | 8/2013 | Weiner et al. |
| 2013/0237734 | A1 | 9/2013 | Wu |
| 2015/0307789 | A1 | 10/2015 | Jia et al. |

FOREIGN PATENT DOCUMENTS

| | | |
|---|---|---|
| EP | 3349894 | 7/2019 |
| JP | S62-114659 A | 5/1987 |
| KR | 101767375 | 8/2017 |
| WO | WO2009029578 | 3/2009 |
| WO | WO2010121807 | 10/2010 |
| WO | WO2011036862 | 3/2011 |
| WO | WO2015/164464 A1 | 10/2015 |
| WO | WO2016170188 | 10/2016 |

OTHER PUBLICATIONS

Extended EP Search Report and Opinion for corresponding EP Application No. 21863016.8, dated Oct. 7, 2024, 9 pages.

Ding et al., "Effect of fluorine and boron modification on the HDS,HDN and HDA activity of hydrotreating catalysts", Applied Catalysis A: General, vol. 301, 2006, pp. 241-250.

Klimov et al., "Bimetallic Co—Mo complexes: A starting material for high active hydrodesulfurization catalysts", Catalysis Today, vol. 150, 2010, pp. 196-206.

Klimov et al., "CoMo/Al2O3 hydrotreating catalysts of diesel fuel with improved hydrodenitrogenation activity", Catalysis Today, vol. 307, Jun. 1, 2018, pp. 73-83.

Klimov et al., "CoMoB/Al2O3 catalysts for hydrotreating of diesel fuel. The effect of the way of the boron addition to a support or an impregnating solution", Catalysis Today, vol. 305, May 1, 2018, pp. 192-202.

Vatutina et al., "Influence of boron addition to alumina support by kneading on morphology and activity of HDS catalyst", Applied Catalysis B: Environmental, vol. 199, Dec. 15, 2016, pp. 23-32.

Yonel-Gumruk et al., "Development of a hydroprocessing catalyst containing Boron", CTSI Cleantech, 2014.

JP Office Action (English translation) for corresponding JP Application No. 2023-513292, dated Jun. 25, 2025, 6 pages.

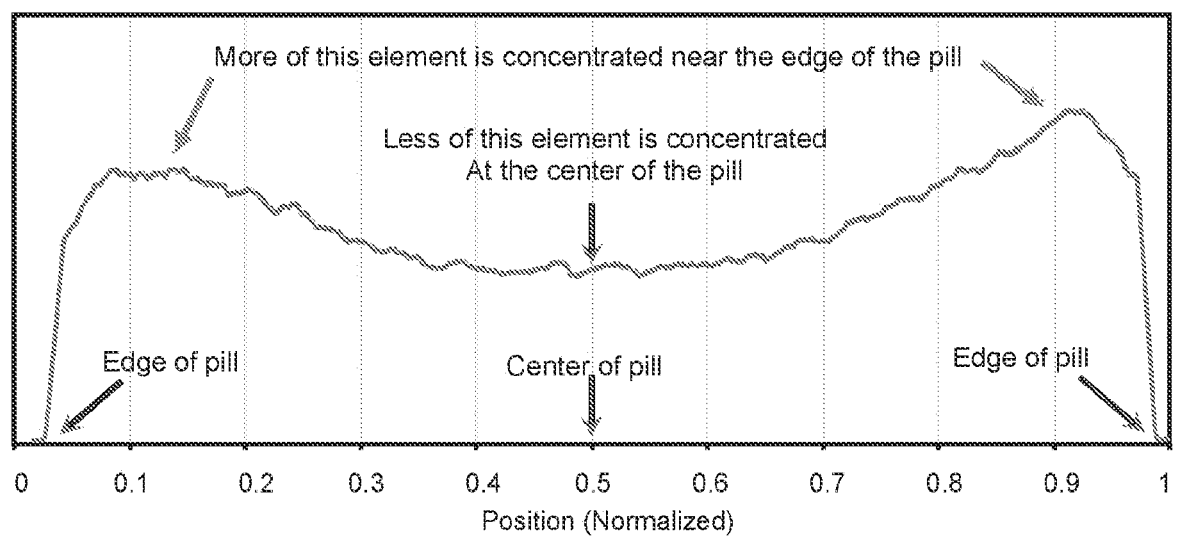
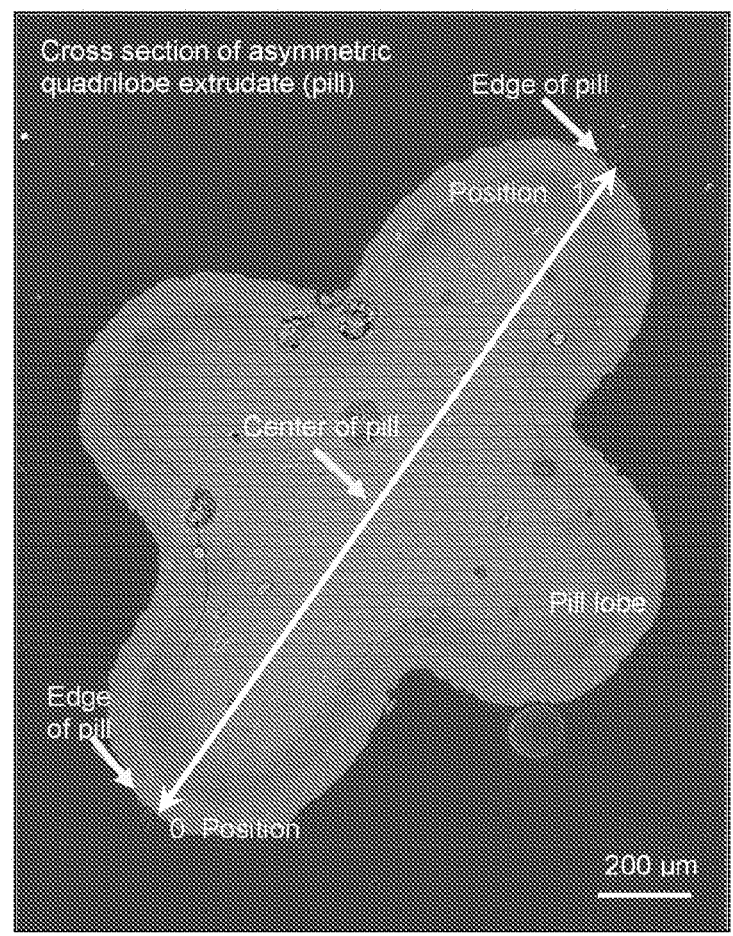
FIG. 2

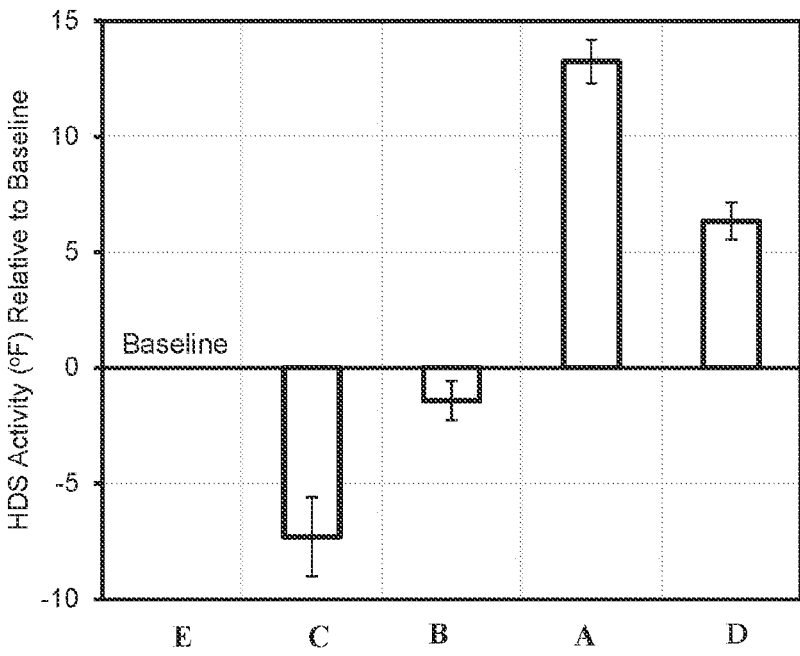
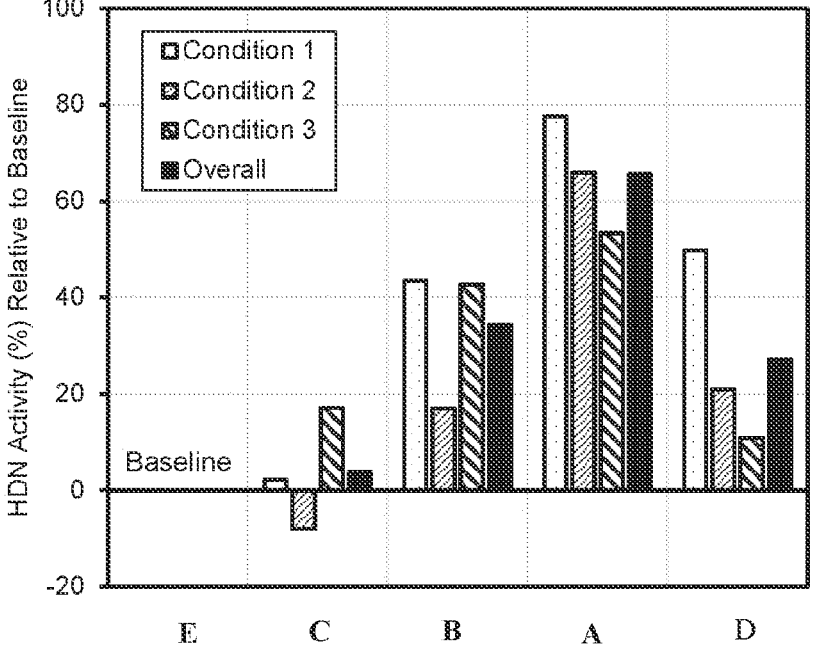
FIG. 8

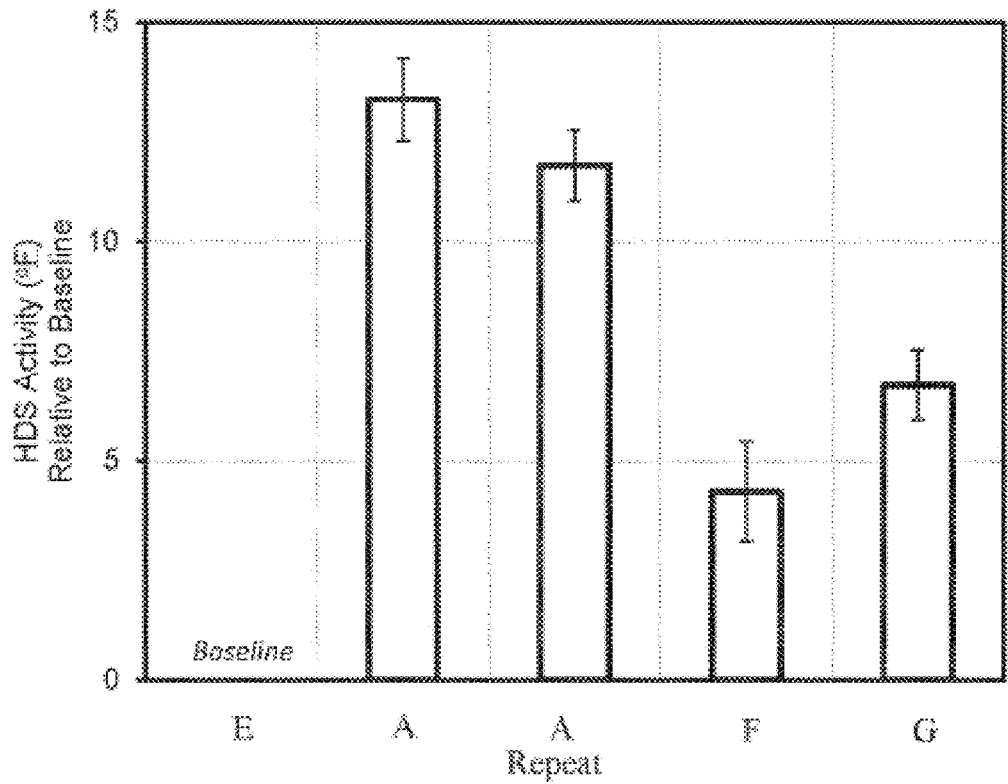
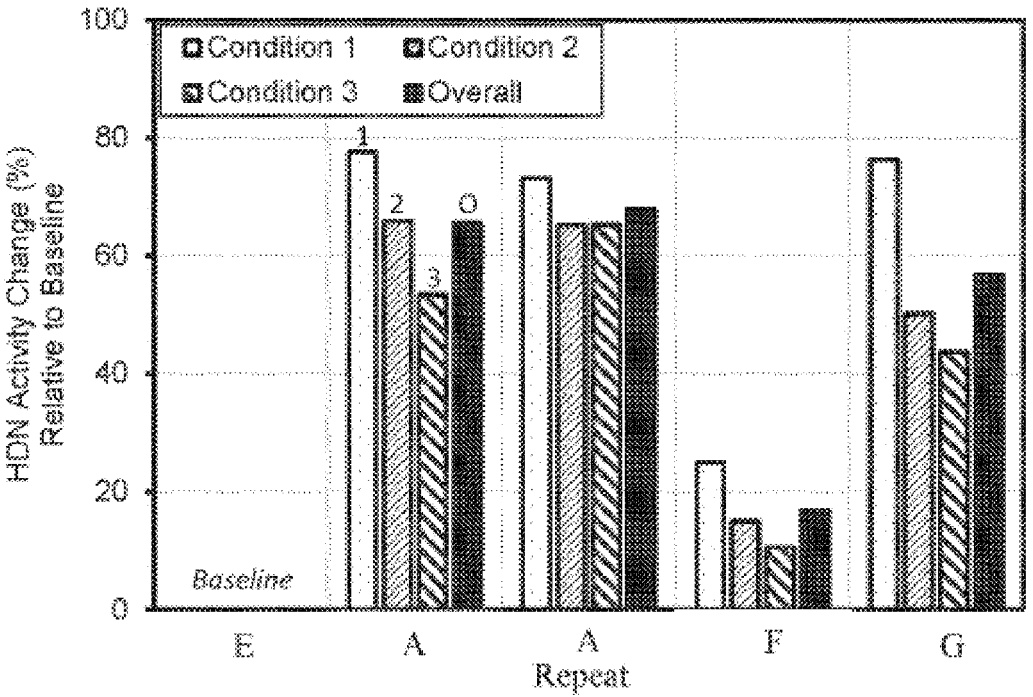
FIG. 10

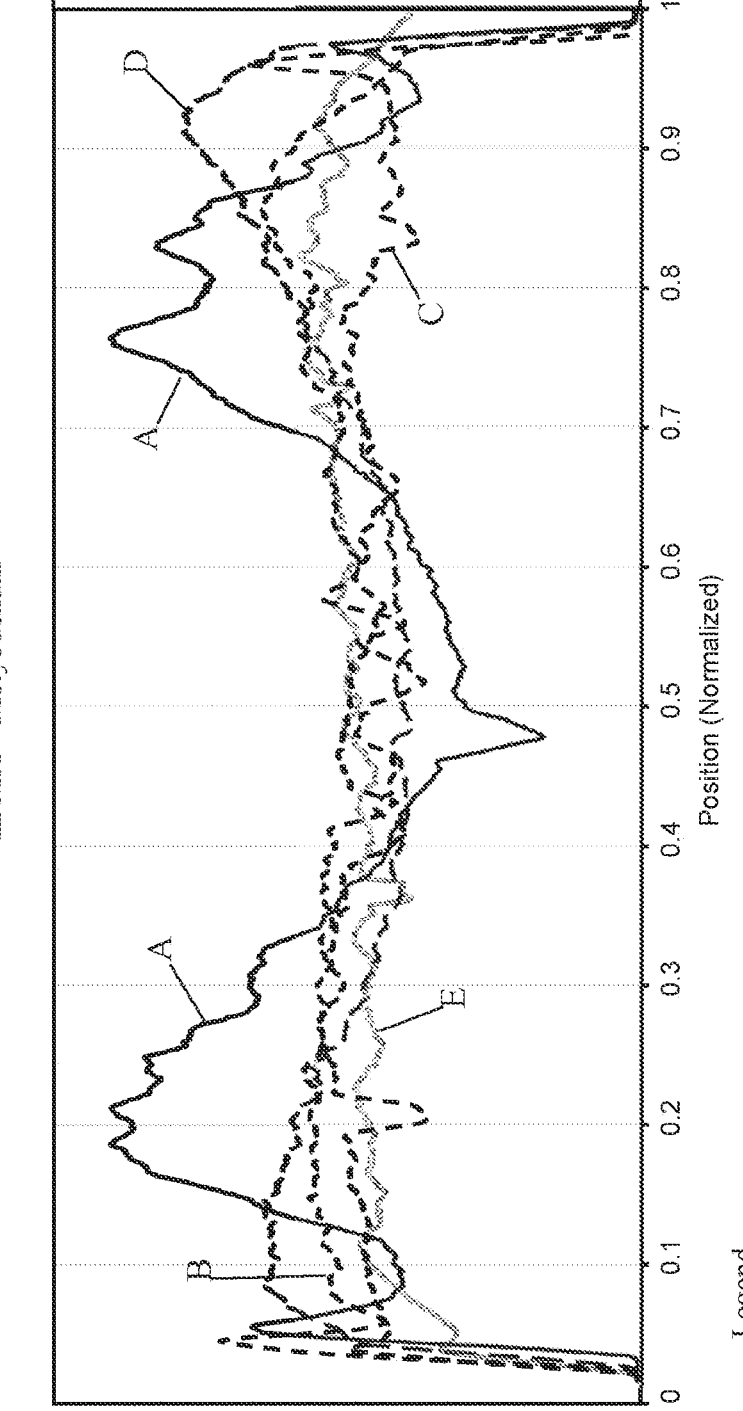

EPMA – Molybdenum

Position (Normalized)

FIG. 15

Legend

A  Inventive method:  Boron/citric impregnated on support, calcined, metals impregnated, calcined again
B  Metals impregnated on support, calcined, boron/citric impregnated, calcined again
C  Metals, boron, and citric impregnated on support together, then calcined
D  Boron added before support is extruded, calcined, metals impregnated, calcined again
E  Metals impregnated on support, calcined; no added boron

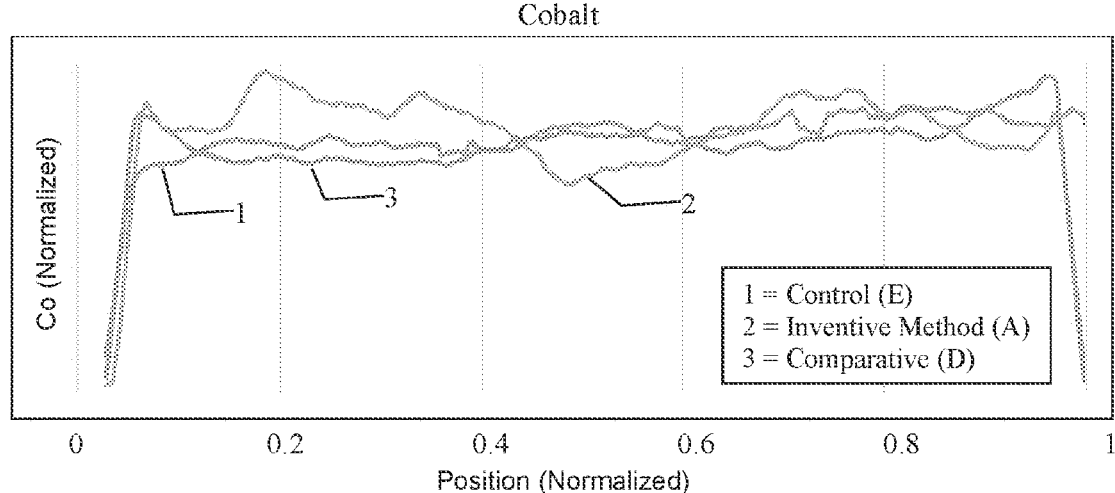
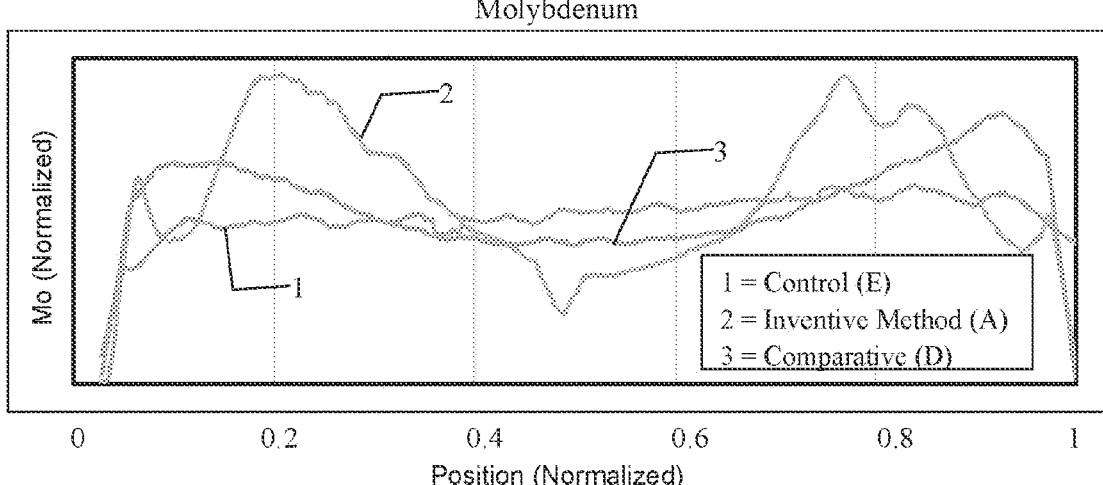
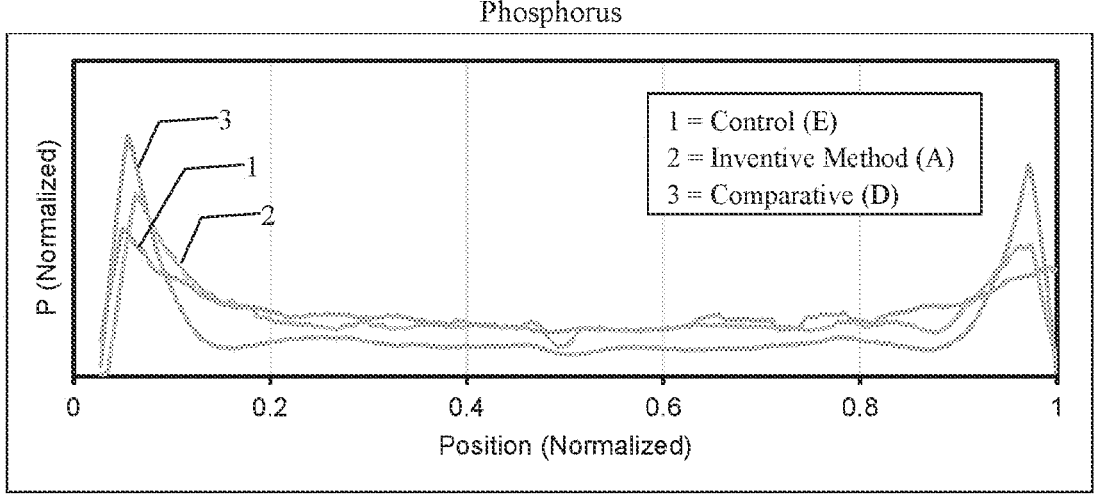
FIG. 16

INCORPORATION OF BORON IN HYDROPROCESSING CATALYSTS, CATALYSTS OBTAINED AND USE THEREOF

CROSS-REFERENCE TO RELATED APPLICATIONS

This application is a U.S. National Phase Application under 35 U.S.C. § 371 of International Application No. PCT/US2021/071273, filed Aug. 25, 2021, which claims priority to and the benefit of U.S. Provisional Application No. 63/070,552, filed Aug. 26, 2020, both of which are hereby incorporated by reference in their entireties.

BACKGROUND OF THE INVENTION

Boron has been identified as an effective promoter species in hydroprocessing catalysts. However alternative methods are described for introducing boron into such catalysts, namely supported catalysts. Some studies indicate that activity is gained by adding boron to an alumina support through kneading or through a precipitation reaction during the alumina synthesis process; others indicate that adding boron to the catalyst via impregnation with catalytically active metals is preferred.

Typically, boron is introduced using boric acid ($H_3BO_3$) as the boron source, although other boron-containing compounds can be used. Adding $H_3BO_3$ directly to the alumina batch tank during synthesis of the alumina is feasible, but inefficient, difficult to meter and control, and results in large amounts of boron eluting from the resulting filter cake. Alternative methods include adding boron further downstream of alumina synthesis closer to or as part of the drying stage of the formed alumina. Alternatively, $H_3BO_3$ can be added to impregnation solutions of catalytic metals that are thereafter added to the alumina before it is dried. A particular limitation to the addition of boron during drying of initially formed alumina and in subsequent mixing steps as discussed above is the risk of macropore formation (pores larger than 1 micron), which is generally detrimental to catalytic activity. A further, well-known option for adding boron to a supported catalyst is through the use of pore volume impregnation (PVI), in which an alumina composition extrudate and an impregnation solution are contacted, the impregnation solution typically containing a mixture of dissolved catalytic metal compounds and, optionally, a chelate. $H_3BO_3$ can be added to these impregnation solutions.

The solubility of boron compounds is an important limiting factor when using impregnation solutions. Boric acid exhibits low water solubility (2.52 g/100 mL at 0° C., which only increases to 5.7 g/100 mL at 25° C.). Its solubility decreases even further in metal impregnation solutions typically used in hydrotreating processes including distillate hydrotreating (DHT). When its solubility limit is reached, the solution becomes unstable and the boric acid component precipitates, resulting in a limited concentration of $B_2O_3$ in the catalyst, for example, less than 1 wt %. The present invention addresses this, among other, shortcomings of prior art technology.

BRIEF SUMMARY OF THE INVENTION

In one embodiment, a method of producing a supported catalyst, the method comprising: (a) combining a porous inorganic oxide catalyst carrier or carrier extrudate with an aqueous solution, dispersion or suspension comprising: (i) a boron-containing source; and (ii) an organic compound or organic chelating agent selected from organic compounds comprising at least two oxygen atoms and 2-10 carbon atoms; to form a boron and organic compound-containing carrier composition and optionally extruding the composition to form an extrudate; (b) calcining, or drying and calcining the composition or extrudate formed in (a) to reduce its volatiles content to a level of greater than 0 wt % to less than about 5 wt %, as measured by Loss on Ignition (LOI); (c) impregnating the calcined composition formed in (b) with a solution, dispersion or suspension comprising at least one Group VIB metal-containing component or source and at least one Group VIIIB metal-containing component or source; and (d) calcining, or drying and calcining the composition formed pursuant to impregnating step (c) to reduce its volatiles content to a level as measured by Loss on Ignition (LOI) of greater than 0 wt % to less than about 30 wt %; wherein: (1) the amount of boron-containing source is sufficient to form a supported catalyst having a boron content in the range of about 1 wt % to about 13 wt %, expressed as boron oxide, $B_2O_3$, and based on the total weight of the catalyst; and (2) Loss on Ignition (LOI) is measured by subjecting a weighed sample to an oxygen-containing atmosphere for 1 hour at 1020° F. (548.9° C.) and measuring the loss in weight of the sample.

In another embodiment, a supported hydroprocessing catalyst comprising: a porous inorganic oxide catalyst carrier or catalyst support; at least one Group VIB metal component in the form of an oxide; at least one Group VIIIB metal component in the form of an oxide; a boron-containing component in the form of an oxide, expressed as $B_2O_3$; and optionally a phosphorus component in the form of an oxide, expressed as $P_2O_5$; and wherein: (a) the content of boron oxide is in the range of 1 to 13 wt %, based on the total weight of the catalyst; (b) the content of the phosphorus component, when present, is at least 1 wt %, based on the total weight of the catalyst, and wherein: (1) the Group VIB and Group VIIIB metal components and phosphorus component and boron component are supported on and/or in a support or carrier comprising alumina or silica in the form of a pill having an internal cross-section and an outer surface; and (2) a position across the internal cross-section of the pill is identified by a percentage of the distance following a centerline from a first edge of the pill cross-section, designated as the starting point or 0% to the furthest edge of the pill cross-section, designated as 100%, along the centerline; and wherein: (I) the concentration of the Group VIB metal oxide in the first 33⅓% or the last 33⅓% of the pill cross-section exceeds the concentration of the Group VIB metal oxide in the central 33⅓% of the pill cross-section by from about 20% to about 100%; and (II) the concentration of the Group VIB and Group VIIIB metal oxide components and phosphorus oxide component when present, across the cross section to the outer surface of the pill is determined using electron probe microanalysis.

In more specific embodiments of the invention disclosed herein, a process is provided to produce a supported catalyst composition, the process comprising (optionally, "consisting essentially of", or "consisting of") the features recited above and the product similarly comprising (optionally, "consisting essentially of", or "consisting of") the above-recited features.

One or more benefits can be realized by practicing the present invention, including:

Improved catalytic activity: As demonstrated by the performance testing and activity results using supported catalysts prepared according to the invention, this claimed method of impregnating boron results in excellent catalytic activity for both hydrodesulfurization (HDS) and hydrodenitrogenation (HDN). Specifically, the supported catalyst preparation method represents a means to obtain high catalytic activity improvements with only a minor increase in raw material or process cost.

Control of final catalyst pore size distribution (PSD): PSD is a significant parameter in controlling catalytic activity and catalytic stability. Depending on how boron is added to the supported catalyst, PSD may be fixed, for example, at lower pore size diameters and cannot be adjusted by the use of other process variables, for example, using changes to the calcination temperature. This can result in a less active catalyst. In contrast, practicing the method of the present invention allows for the use of any inorganic oxide support having any desired initial PSD suitable for the intended hydroprocessing process. Notably, addition of boron according to the method of the present invention does not change pore structure, for example, PSD, as may typically occur when employing prior art kneading, mixing, and other comparable techniques for introducing boron.

Control of boron concentration in the support and supported catalyst: The amount of boron introduced into the support and supported catalyst can be accurately controlled using the inventive method. Specifically, the support can be impregnated with a relatively large quantity of boron without concern surrounding boron solubility or macropore formation in the support. Thus, the amount of boron can be scaled up or down with relative ease in order to optimize catalytic activity in the desired hydroprocessing process.

Mitigated risk of macropore formation. Introducing boron by adding boric acid to an inorganic support material using extrusion-type equipment and indirect heat exchange utilizing a hollow screws or during a mixing, granulation, kneading process is typically associated with the formation of macropores (pores having diameters greater than 1 micron). Macropore formation is considered detrimental and can reduce catalytic activity and stability and is therefore undesirable.

Enhanced flexibility: Generally, the inventive process disclosed herein is readily modifiable by persons skilled in the art. Various metals solutions and supports can be substituted for those exemplified in the disclosure.

Preservation of chelated metals during catalyst synthesis: As disclosed hereinafter, the claimed method typically employs higher temperature and/or extended calcination times during the initial boron impregnation step and subsequently employs less severe drying and/or calcination conditions to produce supported catalyst, which allows for synthesis of high-activity chelated catalysts comprising a desired, target level concentration of boron.

BRIEF DESCRIPTION OF THE DRAWINGS

FIG. 2 illustrates a representative EPMA scan of a non-uniformly distributed element in a cross-section of an asymmetric quadrilobal extrudate prepared according to the present invention and an electron photomicrograph of a cross-section through an extrudate identifying lengthwise longitudinal positions measured using EPMA.

FIG. 8 illustrates HDS and HDN activity of variously prepared supported catalysts.

FIG. 10 illustrates the HDS and HDN activity of variously prepared supported catalysts.

FIG. 15 illustrates EPMA scan results for molybdenum along the longitudinal cross-section of variously prepared supported catalyst particles.

FIG. 16 illustrates EPMA scan results for cobalt, molybdenum and phosphorus along the longitudinal cross-section of selected supported catalyst particles.

DETAILED DESCRIPTION

Definitions

Figure 1:
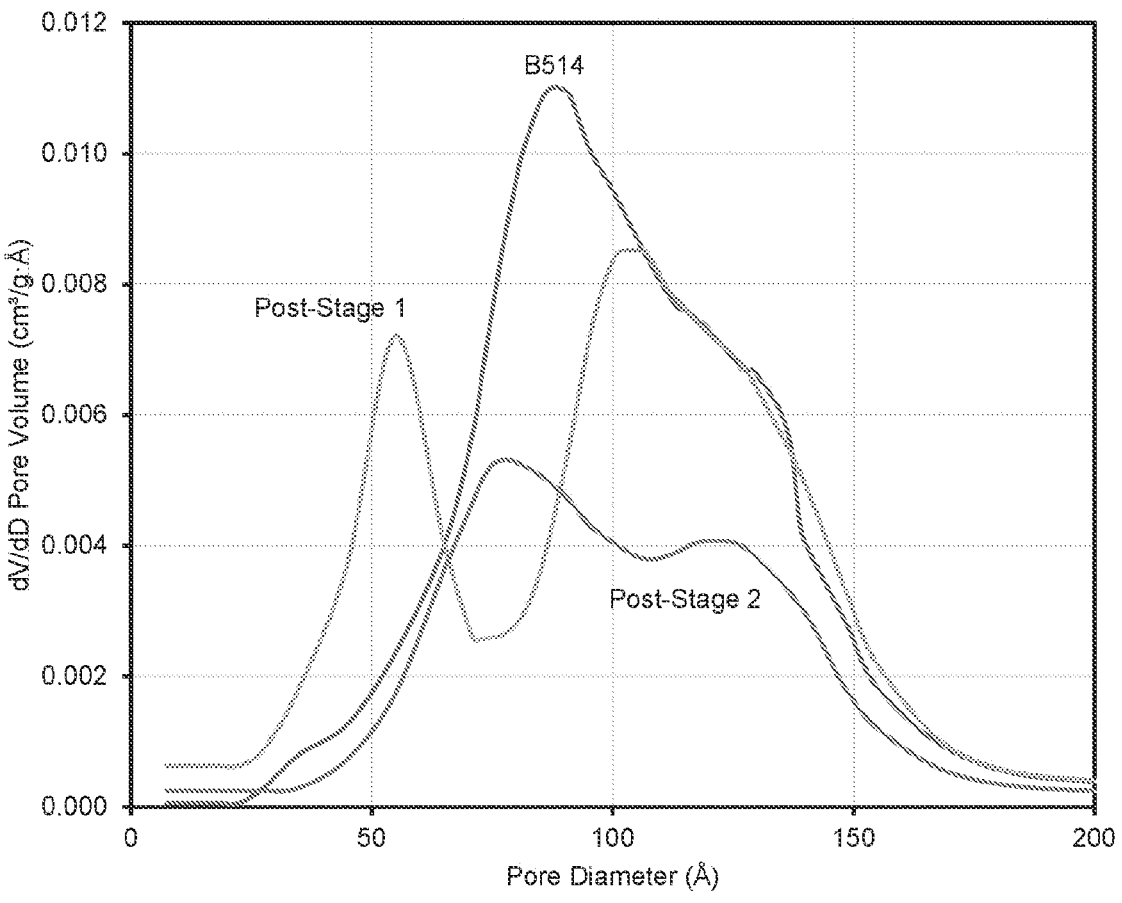
FIG. 1 is a graph of the pore size distribution following the first-stage and second-stage during preparation of a support prepared according to the invention.

In order to more clearly define the terms and phrases used herein, the following definitions are provided. To the extent that any definition or usage provided by any document incorporated herein by reference conflicts with the definition or usage provided herein, the definition or usage provided herein controls.

The term "about" when used as a modifier for, or in conjunction with, a variable, characteristic or condition is intended to convey that the numbers, ranges, characteristics and conditions disclosed herein are flexible and that practice of the present invention by those skilled in the art using temperatures, rates, times, concentrations, amounts, contents, properties such as basal spacing, size, including pore size, pore volume, surface area, etc., that are outside of the stated range or different from a single stated value, will achieve the desired result or results as described in the application, namely, preparation of porous catalyst carrier particles having defined characteristics and their use in preparing active olefin polymerization catalysts and olefin polymerization processes using such catalysts.

The terms "a," "an," "the," etc., are intended to include plural alternatives, e.g., at least one, unless otherwise specified. For instance, the disclosure of "an inorganic oxide", "a Group VIB metal" or "a boron source" is meant to encompass one, or mixtures or combinations of more than one.

The terms "catalyst" and "catalyst system" or catalyst composition are sometimes used interchangeably herein, which use can be apparent from the context of the disclosure.

"Comprise" or "comprising": Throughout the entire specification, including the claims, the word "comprise" and variations of the word, such as "comprising" and "comprises," as well as "have," "having," "includes," "include" and "including," and variations thereof, means that the named steps, elements, components or materials to which it refers are essential, but other steps, elements, components or materials may be added and still form a construct within the scope of the claim or disclosure. When recited in describing the invention and in a claim, it means that the invention and what is claimed is considered to be what follows and potentially more. These terms, particularly when applied to claims, are inclusive or open-ended and do not exclude additional, unrecited elements, components or methods steps.

The term "contact product" is used herein to describe compositions wherein the components are contacted together in any order, unless a specific order is stated or implied by the context of the disclosure, in any manner, and for any length of time. For example, the components can be contacted by blending or mixing. Further, contacting of any component can occur in the presence or absence of any other component of the compositions described herein, unless otherwise stated or implied by the context of the disclosure. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which may be blended, mixed, slurried, dissolved, reacted, treated, or otherwise contacted in some other manner.

"EPMA" or Electron Probe Microanalysis is a test method (further described below) that combines the imaging capability of a focused electron beam with the analytical potential afforded by induced X-rays to produce spatially resolved analyses of a wide range of elements with a detection limit of about 100 mg kg$^{-1}$.

"Group" or "Groups": Any reference to a Group or Groups of the Periodic Table of the Elements is preferably to the Group or Groups as reflected in the Periodic Table of Elements identified by Roman numerals according to, for example, the Periodic Table of the Elements as published in "Hawley's Condensed Chemical Dictionary" (Thirteenth edition, 1997) ("CAS version"). Alternatively, groups can be identified using the IUPAC system for numbering groups of elements as Groups 1-18; see, for example, Periodic Table of the Elements, published by the International Union of Pure and Applied Chemistry (IUPAC), published on-line at http://old.iupac.org/reports/periodic_table/; version dated 19 Feb. 2010 and also shown in the Hawley's publication cited above.

"Loss on Ignition" (LOI) is a measure of the total volatiles present in a sample such as a porous inorganic oxide or such an oxide impregnated with various additives, including a catalyst composition supported on an inorganic oxide or precursor or intermediate of such catalyst. Volatiles are believed to comprise or consist essentially of water and thermally and/or oxidatively degradable or degraded organic components or residues. For purposes of the present disclosure, the LOI test is conducted by subjecting a sample to an oxygen-containing atmosphere for 1 hour at 1020° F. (548.9° C.), thereby oxidizing, degrading or igniting organic matter and driving off such matter as well as most, if not all, residual moisture in the catalyst.

"Average pore diameter" (APD) of a support or supported catalyst can be calculated based on the measured total pore volume (V) and measured total surface area of a support or supported catalyst according to the equation, APD=4V/A; results are expressed in angstroms.

"Pore Volume" or "Total Pore Volume" as used herein means the cumulative volume in cc/g of all pores discernable by either nitrogen desorption or mercury penetration, also referred to as mercury intrusion (porosimetry) methods. For catalyst support or carrier particles and particularly for alumina powder, the pore diameter distribution and pore volume can be calculated with reference to nitrogen desorption isotherm (assuming cylindrical pores) by the B.E.T. (or BET) technique as described by S. Brunauer, P. Emmett, and E. Teller in the Journal of American Chemical Society, 60, pp 209-31.9 (1939); see also ASTM D 3037, which identifies the procedure for determining the surface area using the nitrogen BET method.

"Pore Size Distribution (PSD) is determined using ASTM D4284-07, "A Standard Test Method for Determining Pore Volume Distribution of Catalysts by Mercury Intrusion Porosimetry". The method is an accepted test that is used to determine the volume distribution of pores in catalysts and catalyst carrier or support particles with respect to the apparent diameter of the entrances to pores. As discussed above, generally both the size and volume of pores in a catalyst affect its performance. Thus, the pore volume distribution is useful in understanding catalyst performance and may be one of the characteristics specified for a catalyst that can be expected to perform in a desired manner. The values for pore volume, including total pore volume or total intrusion volume, and various attributes of pore volume distribution, such as the percentage of pores in various size ranges, as well as pore mode, are based on the mercury intrusion method.

The pore diameter distribution can be calculated by means of the formula:

$$\text{pore diameter (in Angstroms)} = \frac{150,000}{\text{absolute mercury pressure (in bar)}}$$

and in accordance with the mercury penetration method (as described by H. L. Ritter and L. C. Drake in Industrial and Engineering Chemistry, Analytical Edition 17, 787 (1945)), using mercury pressures of 1-2000 bar. Mercury penetration is the technique of choice when the quantity of pores <60 Å in diameter is small as is the case, for example, in agglomerates.

The total $N_2$ pore volume of a sample is the sum of the nitrogen pore volumes as determined by the above described nitrogen desorption method. Similarly, the total mercury pore volume of a sample is the sum of the mercury pore volumes as determined by the mercury penetration method described above using, for example, a contact angle of 130°, a surface tension of 485 dynes/cm and a Hg density of 13.5335 gm/cc.

"Surface area" refers herein to the specific surface area determined by nitrogen adsorption using the BET technique as described above, whether in powder or agglomerate form.

All morphological properties involving weight, such as pore volume, PV (cc/g) or surface area, (SA) (m²/g) can be normalized to a "metals free basis in accordance with procedures well-known in the art. However, the morphological properties reported herein are on an "as-measured" basis without correcting for metals content.

"Substantially": Unless otherwise defined with respect to a specific property, characteristic or variable, the term "substantially" as applied to any criteria, such as a property, characteristic or variable, means to meet the stated criteria in such measure such that one skilled in the art would understand that the benefit to be achieved, or the condition or property value desired is met. For example, see below for use of the term "substantially" in connection with a description of a metallocene catalyst or catalyst system in the substantial absence of an aluminoxane or borate activator. Alternatively, the phrase "substantially free of" with respect to, for example, an aluminoxane or borate activator is used to convey the same concept, condition or result. In other words, the term "substantially" serves reasonably to describe the subject matter so that its scope will be understood by persons skilled in the field of the invention, and to distinguish the claimed subject matter from prior art.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application. Applicants disclose several types of ranges in the present invention. These include, but are not limited to, a range of weight ratios, a range of molar amounts or ratios, a range of temperatures, and so forth. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein.

Porous Carrier or Support Materials

Examples of suitable inorganic, particulate, foraminous (or porous) carrier materials include silica, silica gel, silica-alumina, alumina, titania, titania-alumina, zirconia-alumina, zirconia, boria, terrana, kaolin, magnesium silicate, magnesium carbonate, magnesium oxide, aluminum oxide, precipitated aluminum oxide, activated alumina, bauxite, kieselguhr, pumice, natural clays, synthetic clays, cationic clays or anionic clays such as saponite, bentonite, kaolin, sepiolite or hydrotalcite, and mixtures thereof. Preferred foraminous carrier components are silica, silica-alumina, alumina, titania, titania-alumina, zirconia, bentonite, boria, and mixtures thereof; silica, silica-alumina, alumina and mixtures thereof are especially preferred. Alumina can be prepared, e.g., from an alumina precursor such as boehmite or pseudo-boehmite.

When the porous inorganic oxide support is alumina or an alumina containing composition, the crystalline form of alumina will depend on calcination conditions used in the process, particularly temperature and a combination of time and temperature. For example, a calcination temperature range of 400° C.-800° C. typically produces gamma-alumina, a calcination temperature of 800° C.-1150° C. typically produces theta-alumina and a calcination over 1150° C. typically results in the formation of alpha-alumina. Of the above forms, gamma- or theta-alumina is preferred, whereas alpha-alumina is less preferred because it typically contains a higher content of pores having a diameter of over 1000 Angstroms, unless such larger pores are more desirable for use in connection with the specifically contemplated hydro-processing or hydrotreating operation. By employing other temperatures and times, it is also possible to obtain eta-alumina, chi-alumina, etc.

A typical method for preparing alumina-containing particles for use as the inorganic oxide or component of the inorganic oxide supported catalyst, uncalcined pseudoboehmite alumina powder is thoroughly mixed with water, or optionally with a dilute aqueous solution comprising an inorganic acid such as nitric acid or an organic acid such as acetic or formic acid, and the alumina mixture, containing about 50 to 65 weight percent moisture, is formed into catalyst carrier particles having a desired size and shape, preferably by extrusion.

Suitable shapes include powders, spheres, cylinders, rings, and symmetric or asymmetric polylobal forms, for instance tri- and quadrilobal, which shapes are generically referred to as a "pill". Particles resulting from extrusion, beading or pelleting usually have a diameter in the range of about 0.2 to about 10 mm, and lengths in the range of about 0.5 to about 20 mm, but deviations from these general ranges are possible. Catalysts support particles and supported catalysts formed from extrudates are generally preferred.

Calcination

The process of the present invention typically includes two independent calcination steps as hereinafter described in detail. Generally, calcination may be done batchwise or continuously by contacting the shaped carrier or support product or the impregnated, shaped carrier or support composition with hot gases, which may be either indirectly heated gases or the combustion products of ordinary fuels with air or heated air or inert gases. Regardless of the particular method used, the calcination is typically conducted at temperatures of about 538° C. (1000° F.) to about 1093° C. (2000° F.); alternatively at about 649° C. (1200° F.) to about 1038° C. (1900° F.); such as about 760° C. (1400° F.) to about 982° C. (1800° F.), for periods of from about 30 minutes to about 3 hours; alternatively about 45 minutes to about 2.5 hours; preferably about 30 minutes to about 2 hours. Alternatively, calcination can be conduct at temperatures ranging from about 400° C. to about 1150° C.; or about 500° C. to about 1000° C.; or about 600° C. to about 800° C.; or about 800° C. to about 1150° C. Also suitable are calcination temperatures from about 400° C., or about 450° C., or about 500° C., or about 550° C., or about 600° C., or about 650° C., or about 700° C., or about 750° C., or about 800° C.; to about 500° C., or about 550° C., or about 600° C., or about 650° C., or about 700° C., or about 750° C., or about 800° C., or about 850° C., or about 900° C., or about 900° C., or about 950° C., or about 1000° C., or about 1050° C., or about 1100° C.; provided that each recited lower temperature value is associated with an upper temperature value to create a suitable calcination temperature range.

The extruded, shaped inorganic oxide particles impregnated with boron and a selected organic compound from stage 1 can be calcined, for example, at a temperature of about 400° C. to about 750° C. for about one to two hours; or dried, for example at a temperature of about 110° C. to about 150° C., and then calcined at a temperature of about 400 to about 750° C. for about one to two hours, provided that the calcined particles exhibit an LOI of greater than 0 wt % and less than about 5 wt %. On the other hand, the inorganic oxide particles comprising at least one metal from Group VIB and at least one metal from Group VIIB and optionally, but preferably containing phosphorus, in other words, the composition produced in stage 2, can be calcined, for example, at a temperature of about 400° C. to about 750° C. for about one to two hours; or dried, for example at a temperature of about 110° C. to about 150° C., and then calcined at a temperature of about 400 to about 750° C. for about one to two hours, provided that the calcined particles exhibit an LOI of greater than 0 wt %, preferably greater than about 1 wt % or about 2 wt % or about 3 wt % and less than about 30 wt % or less than about 20 wt % or less than 15 wt % or less than 7 wt %.

The particular conditions of temperature and time selected for one or more calcination steps is readily ascertained by a person of ordinary skill using simple experiments in order to produce a desired level of "loss on ignition" (LOI) of the composition being calcined, including (1) the shaped, porous carrier or support impregnated with boron and an organic compound selected from those described elsewhere herein and referred to as the first-stage; or (2) the shaped, porous carrier or support containing boron and an organic compound from (1) and further impregnated with at least one Group VIB and at least one Group VIIIB catalytic metal, and optionally, but preferably, phosphorus, referred to as the second-stage. As disclosed elsewhere herein, typical and preferred LOI values and ranges for compositions (1) and (2) can be different from one another. Typically, the LOI of the composition produced in stage (1) and following calcination will be less than the LOI of the composition produced in stage (2) following calcination. Thus, the temperature and/or time calcination conditions in stage 1 will be more severe than the calcination conditions used in stage 2.

Therefore, the organic compound or organic chelating agent introduced along with the boron source in the first-stage will be substantially or totally degraded and/or burned off as a result of the first stage calcining conditions. On the other hand, if an organic chelating agent is introduced in combination with one or more catalytically active metals in the second-stage pore volume impregnation step, the less severe calcining conditions typically used in the second-stage can permit retention of a portion of the organic chelating agent or one or more complexes formed by the chelating agent and one of more of the catalytically active metals or a residue or degradation product of the chelating agent or complex or combination of such components. For ease of reference in the disclosure or claims, the presence of one or more of such components in the supported catalyst composition resulting from the second-stage of the inventive process is simply referred to as "organic additive", although, as described, it can comprise a complicated organic-containing mixture.

Suitable boron components, compounds or sources for use in the present invention include inorganic and organic boron compounds. Such compounds include meta-boric acid (HBO$_2$), ortho-boric acid (H$_3$BO$_3$), hypoboric acid, also known as tetrahydroxydiboron, ammonium borate tetrahydrate [(NH$_4$)$_2$B$_4$O$_7$·4H$_2$O], sodium tetra borate, ammonium borate, ammonium tetra borate (NH$_4$)$_2$B$_4$O$_7$, boric oxide (B$_2$O$_3$), various mono-, di- and tri-alkyl amine borates and including, for example, triethanol amine borate, dimethylaminoborane, triethylborane, tributylborane, trimethyl borate, triethyl borate and tricyclohexyl borate, ammonium tetra phenyl borate, or the like. Particularly suitable non-limiting examples of the boron component include ortho-boric acid (H$_3$BO$_3$) and ammonium tetra borate tetra-hydrate [(NH$_4$)$_2$B$_4$O$_7$·4H$_2$O] and mixtures of two or more of the foregoing.

The amount of the boron component in the catalyst will typically be in the range of about 1 to about 13 wt %, expressed as an oxide (B$_2$O$_3$) and based on the total weight of the catalyst. In a preferred embodiment of this invention, the amount of boron component is in the range of about 1.5 wt % to about 6 wt %, expressed as an oxide (B$_2$O$_3$) and based on the total weight of the catalyst. In another aspect of the invention, the amount of boron component is in the range of about 2 wt % to about 5 wt % or about 4 wt % to about 6 wt %, expressed as an oxide (B$_2$O$_3$) and based on the total weight of the catalyst. Thus, boron, expressed as an oxide (B$_2$O$_3$) and based on the total weight of the catalyst in the range of about 1.0, 1.25, 1.5, 1.75, 2.0, 2.25, 2.5, 2.75, 3.0, 3.25, 3.5, 3.75, or about 4 wt %; to about 6 wt %, 6.25, 6.5, 6.75, 7 wt %, 7.25 wt %, 7.5 wt %, 7.75 wt %, 8.0 wt %, 8.25 wt %, 8.5 wt %, 8.75 wt %, 9.0 wt %, 9.25 wt %, 9.5 wt %, 9.75 wt %, 10.0 wt %, 10.5 wt %, 11.0 wt %, 11.5 wt %, 12.0 wt %, 12.5 wt % or about 13.0 wt % expressed as an oxide (B$_2$O$_3$) and based on the total weight of the catalyst.

In the practice of this invention, a phosphorus component or phosphorus source is optional, but typically preferable, and when used is a compound which is typically a water soluble, acidic phosphorus compound, particularly an oxygenated inorganic phosphorus-containing acid. Examples of suitable phosphorus compounds include metaphosphoric acid, pyrophosphoric acid, phosphorous acid, orthophosphoric acid, triphosphoric acid, tetraphosphoric acid, and precursors of acids of phosphorus, such as ammonium hydrogen phosphates (mono-ammonium di-hydrogen phosphate, di-ammonium mono-hydrogen phosphate, tri-ammonium phosphate). Mixtures of two or more phosphorus compounds can be used. The phosphorus component or compound may be used in liquid or solid form. A preferred phosphorus compound is orthophosphoric acid (H$_3$PO$_4$) or an ammonium hydrogen phosphate, preferably in aqueous solution.

The amount of phosphorus compound employed in the catalyst can vary depending on the process in which the supported catalyst will be used and thus it is within the scope of the invention to exclude phosphorus from the supported catalyst composition; in other words, 0 wt % P$_2$O$_5$. However, when a phosphorous source is included, it typically will be sufficient to provide at least about 0.5 wt % (as the oxide P$_2$O$_5$), based on the total weight of the catalyst. In other aspects of the invention, about 0.5 wt % to about 5 wt %, or at least about 1 wt % or about 2 wt % (as the oxide P$_2$O$_5$), based on the total weight of the catalyst. In still other aspects of the invention, the amount of phosphorus compound employed will be sufficient to provide phosphorus in the range of about 4 to about 10 wt % (as the oxide P$_2$O$_5$), based on the total weight of the catalyst. In another aspect of this invention, the amount of phosphorus compound employed is sufficient to provide phosphorus in the range of about 4 to about 7 wt % (as the oxide P$_2$O$_5$), based on the total weight of the catalyst. Thus, phosphorus in the range of about 0, 0.25, 0.5, 0.75, 1.0, 1.25, 1.5, 1.75, 2.0, 2.25, 2.5, 2.75, 3.0, 3.25, 3.5, 3.75, or about 4 wt % to about 7 wt %, 7.25 wt %, 7.5 wt %, 7.75 wt %, 8.0 wt %, 8.25 wt %, 8.5 wt %, 8.75 wt %, 9.0 wt %, 9.25 wt %, 9.5 wt %, 9.75 wt %, 10.0 wt %, 10.5 wt %, 11.0 wt %, 11.5 wt %, 12.0 wt %, 12.5 wt % or about 13.0 wt %.

Suitable catalytically active elements or metals from Group VIIIB of the periodic table present in components of the invention may include Fe, Co, Ni, Pd, Pt, Rh, Ru and the like and mixtures thereof. Of these, the most preferable are Co, Ni and Pt. Suitable Group VIB elements or metals include Cr, Mo, W, and mixtures thereof; most preferred are Mo and W. Typically, there is present about 5 to about 40 wt %, alternatively about 6 to about 35 wt %, or about 7 to about 30 wt % or about 8 to about 25 wt % Group VIB metal oxide, e.g., $MoO_3$ and/or $WO_3$, present in the supported catalyst. Also typically, there is present about 1 to about 20 wt %, alternatively about 2 to about 18 wt %, or about 3 to about 16 wt % or about 4 to about 14 wt % Group VIB metal oxide, e.g., CoO and/or NiO, present in the supported catalyst. Preferred combinations of metal components comprise, e.g., nickel and molybdenum, cobalt and molybdenum, tungsten and nickel or cobalt, molybdenum and a combination of cobalt and nickel, tungsten and a combination of nickel and cobalt, a combination of molybdenum and chromium and nickel, etc.; the combination of molybdenum and nickel and/or cobalt is particularly preferred. For each of the just recited metal combinations, phosphorus is an optional, but preferably included component. The amounts of Group VIB metals and Group VIIIB metals can be determined using standard, well-known analytical methods such as atomic absorption spectrometry (AAS), inductively-coupled plasmaspectrometer (ICP) analysis and/or x-ray fluorescence (XRF).

A suitable process for preparing a stable impregnating solution can be described as follows:

Preparation of catalytically active metal solutions or dispersions for pore volume impregnation in the second-stage impregnation is well known to those skilled in the art; see, for example, U.S. Pat. Nos. 7,390,766; 7,560,407; and 7,642,212; incorporated herein by reference to the extent permitted. An exemplary useful preparative method is described in the following paragraphs.

An amount of a substantially water-insoluble Group VIIIB metal component is added to water to form a slurry. The amount of the Group VIIIB metal component is low relative to the amount of the Group VIB metal component that will be added in a subsequent step. The specific amount of the substantially water-insoluble Group VIIIB metal component can be characterized by the molar ratio of the Group VIIIB metal to the Group VIB metal in the final impregnating solution; typically, the molar ratio is from about 0.05 to about 0.75; other suitable ranges of this variable and others are described below.

For catalyst compositions that optionally, but preferably include a phosphorus component, to the aqueous slurry of the substantially water-insoluble Group VIIIB metal component just described, is added an aqueous solution of a water-soluble, phosphorus-containing acidic component. The amount of acidic phosphorus component is low relative to the amount of the Group VIB metal component that will be added in a subsequent step, and is at a level that may be insufficient to cause the Group VIIIB metal component to become substantially soluble at this stage of the process, although it is believed that the components added in these just recited steps undergo reaction. Typically, a slurry of the components is obtained at this stage. The specific amount of the water-soluble, phosphorus-containing acidic component can be characterized by the molar ratio of elemental phosphorus to the Group VIB metal in the final impregnating solution; typically this molar ratio is from about 0.01 to about 0.80. The concentration of the Group VIB metal component in the impregnating solution composition can be quite high, up to about 50 weight percent, expressed as the oxide, and based on the total weight of the impregnating solution composition. It will be apparent to those skilled in the art that more dilute solutions, useful for particular applications, can be obtained by diluting the concentrated composition with a suitable amount of water.

Additional Group VIIIB metal, in the form of a substantially water-soluble Group VIIIB metal component, can be added to the compositions hereinafter as required to give the desired level of Group VIIIB metal component and the desired ratio of Group VIIIB metal component to Group VIB metal component in the obtained catalyst. The molar ratio of Group VIIIB metal component to Group VIB metal component can thus be varied from about 0.05 to about 1.0. The catalyst impregnating compositions produced by the method described, allow for high concentrations of the Group VIB metal component at low relative concentrations of both the phosphorus and Group VIIIB metal components. The low relative concentration of the phosphorus component can be advantageous for the preparation of catalysts that may benefit from or tolerate a low level of phosphorus. Additionally, the obtained catalyst impregnating solution is surprisingly stable, i.e., it can be stored for extended periods as a solution without the formation of precipitated species.

A low relative concentration of the Group VIIIB metal component can be advantageous. First, such compositions allow for the preparation of catalysts with a wide range of ratios of Group VIIIB metal component to Group VIB metal component. Second, a substantial amount of the Group VIIIB metal component required for the finished catalyst can be added in the form of a substantially water-soluble Group VIIIB metal component that might otherwise be difficult to solubilize in the presence of a large amount of Group VIB metal component unless a significantly larger amount of the acidic phosphorus component was used. Substantially water-soluble Group VIIIB metal components, especially the salts of mineral acids (e.g., nitrates), can be more cost-effective than the substantially water-insoluble Group VIIIB metal component salts (e.g., carbonates). Third, controlled heating of the impregnated catalyst at elevated temperature, but in the absence of calcining or calcining at lower than typical calcining temperatures can facilitate removal of moisture from the catalyst, thus preserving an effective amount of the chelating agent or chelating agent metal complex while reducing the adverse impact of excessive moisture during start-up when the catalyst is used in hydro-processing or hydroconversion operations. Alternatively, controlled heating and calcination can be employed to achieve the desired level of LOI in an intermediate or final supported catalyst composition.

Suitable Group VIIIB metal components for use in the invention that are characterized herein as substantially insoluble in water include the citrates, oxalates, carbonates, hydroxy-carbonates, hydroxides, phosphates, phosphides, sulfides, aluminates, molybdates, tungstates, oxides, or mixtures thereof. Oxalates, citrates, carbonates, hydroxy-carbonates, hydroxides, phosphates, molybdates, tungstates, oxides, or mixtures thereof are preferred; most preferred are hydroxy-carbonates and carbonates. Generally, the molar ratio between the hydroxy groups and the carbonate groups in the hydroxy-carbonate is in the range of about 0-4; preferably about 0-2; more preferably about 0-1; and most preferably about 0.1-0.8. In particular, suitable substantially water insoluble components providing a Group VIIIB metal are the oxide, carbonates and hydroxides of nickel and cobalt.

Suitable substantially water-soluble components providing a Group VIIIB metal for use in the invention include salts, such as nitrates, hydrated nitrates, chlorides, hydrated chlorides, sulfates, hydrated sulfates, formates, acetates, or hypophosphite. Suitable substantially water-soluble nickel and cobalt components include nitrates, sulfates, acetates, chlorides, formates or mixtures thereof, as well as nickel hypophosphite. Suitable water-soluble iron components include iron acetate, chloride, formate, nitrate, sulfate or mixtures thereof. In particular, substantially water-soluble components are salts such as nickel and cobalt nitrates, sulfates, and acetates.

An indicator of the relative solubility of the substantially insoluble and soluble components can be found, for example, by comparing nickel carbonate to nickel nitrate or nickel sulfate. As reported in the CRC Handbook of Chemistry and Physics, $69^{th}$ Ed., 1988-9 (R. C. Weast, Ed., CRC Press), nickel carbonate has a solubility of about 0.009 g/100 mL of water whereas nickel nitrate has a solubility of about 239 g/100 mL and nickel sulfate a solubility of about 29-76 g/100 mL, depending on the water of hydration of the particular salt. Furthermore, the solubility of the sulfate salts increases to about 87-476 g/100 mL in hot water. Consequently, one skilled in the art will understand the reference to "substantial" with regard to water solubility of these components. Alternatively, for purposes of the present invention, the aqueous solubility of a substantially water insoluble Group VIIIB metal component is generally less than 0.05 moles/100 mL (at 18° C.); conversely, the solubility of a substantially water-soluble component is greater than 0.05 moles/100 mL, e.g., greater than about 0.10 moles/100 mL (at 18° C.).

Suitable components providing a Group VIB metal include both substantially water-soluble and substantially water insoluble components. Suitable substantially water-soluble Group VIB metal components include Group VIB metal salts such as ammonium or alkali metal monomolybdates and tungstates as well as water-soluble isopoly-compounds of molybdenum and tungsten, such as metatungstic acid, and metatungstate salts, or water-soluble heteropoly compounds of molybdenum or tungsten comprising further, e.g., P, Si, Ni, or Co or combinations thereof. Suitable substantially water-soluble isopoly- and heteropoly compounds are given in Molybdenum Chemicals, Chemical data series, Bulletin Cdb-14, February 1969 and in Molybdenum Chemicals, Chemical data series, Bulletin Cdb-12a-revised, November 1969. Suitable substantially water-soluble chromium compounds include chromates, isopolychromates and ammonium chromium sulfate. Suitable Group VIB metal components that are substantially water insoluble, e.g., having a low solubility in water, include di- and trioxides, carbides, nitrides, aluminium salts, acids, sulfides, or mixtures thereof. Preferred substantially insoluble Group VIB metal components are di- and trioxides, acids, and mixtures thereof. Suitable molybdenum components include molybdenum di- and trioxide, molybdenum sulfide, molybdenum carbide, molybdenum nitride, aluminium molybdate, molybdic acids (e.g. $H_2MoO_4$), ammonium phosphomolybdate, ammonium di- and hepta-molybdate, or mixtures thereof; molybdic acid and molybdenum di- and trioxide are preferred. Suitable substantially insoluble tungsten components include tungsten di- and trioxide, tungsten sulfide ($WS_2$ and $WS_3$), tungsten carbide, orthotungstic acid ($H_2WO_4 \cdot H_2O$), tungsten nitride, aluminium tungstate (also meta- or polytungstate), ammonium phosphotungstate, or mixtures thereof; ammonium metatungstate, orthotungstic acid and tungsten di- and trioxide are preferred. Most preferred is molybdenum trioxide, $MoO_3$. For purposes of the present invention, the aqueous solubility of a substantially water insoluble Group VIB metal component is generally less than 0.05 moles/100 mL (at 18° C.); conversely, the solubility of a substantially water-soluble component is greater than 0.05 moles/100 mL, e.g., greater than about 0.10 moles/100 mL., the oxides such as molybdenum trioxide, molybdenum blue, also identified as molybdenum pentoxide, tungstic oxide, etc.; the acids, e.g., molybdic, tungstic and chromic acids; metal salts such as the ammonium, alkali and alkaline earth metals, e.g., ammonium heptamolybdate, ammonium phosphomolybdate, ammonium paratungstate; and the complex salts of Group VIB and Group VIII metals such as complex cobalt and nickel phosphomolybdates. Other suitable metal salts can readily be determined by referring to the above-noted reference or another suitable reference available to the skilled artisan.

When present, the phosphorus-containing acidic component is substantially water soluble, preferably a water soluble, acidic component that may be an oxygenated inorganic phosphorus-containing acid such as phosphoric acid although any one or more of the phosphoric acids may be used, including orthophosphoric acid, metaphosphoric acid, pyrophosphoric acid, triphosphoric acid and tetraphosphoric acid and mixtures thereof. For the purposes of the invention, substantial phosphorus water solubility means sufficient solubility to react with the substantially water-insoluble Group VIII metal component. Additionally, a soluble salt of phosphoric acid, such as the ammonium phosphates may also be used. Phosphoric acid may be added to the solution in liquid or solid form. A preferred compound is orthophosphoric acid ($H_3PO_4$) in a highly concentrated aqueous solution, although any suitable form of phosphoric acid or precursor thereof, e.g., phosphorus pentoxide ($P_2O_5$) may be utilized. Naturally, concentrated acid may be appropriately diluted for use or an appropriate form of dilute acid may be used directly.

Suitable compounds or chelating agents include organic additives such as (i) an organic compound selected from the group consisting of compounds comprising at least two oxygen atoms and 2-10 carbon atoms and the compounds built up or derived from these compounds, or (ii) an organic compound comprising at least one covalently bonded nitrogen atom and at least one carbonyl moiety, or both (i) and (ii). The organic compound according to (i) above preferably is selected from the group of compounds comprising at least two oxygen-containing moieties, such as a carboxyl, carbonyl or hydroxyl moiety, and 2-10 carbon atoms, and the compounds built up or derived from these compounds. Compounds built up or derived from the organic compounds may be, for example, the ether, ester, acetal, acid chloride, acid amide, oligomer or polymer of the organic compound. Examples of suitable organic compounds include carboxylic acids such as citric acid, tartaric acid, oxalic acid, malonic acid, maleic acid and malic acid; and butanediol, pyruvic aldehyde, glycol aldehyde, and acetaldol. Organic compounds selected from the group of compounds comprising at least two hydroxyl groups and 2-10 carbon atoms per molecule and the compounds built up from these compounds are even more preferred. Suitable compounds include, e.g., tartaric acid, or aliphatic alcohols such as ethylene glycol, propylene glycol, glycerin, trimethylol ethane, trimethylol propane, etc. Compounds built up from these organic compounds include oligo- and polymers, e.g., diethylene glycol, dipropylene glycol, trimethylene glycol, triethylene glycol, tributylene glycol, tetraethylene glycol, tetrapentylene glycol. This range can be extrapolated to include, e.g., polyethers like polyethylene glycol. Regarding polyethylene glycol, polyethylene glycol having a molecular weight between 200 and 8,000 is preferred. Other compounds built up from these organic compounds are, e.g., ethers such as ethylene glycol monobutyl ether, diethylene glycol monomethyl ether, diethylene glycol monoethyl ether, diethylene glycol monopropyl ether, and diethylene glycol monobutyl ether. Preferred organic compounds are, inter alia, ethylene glycol, diethylene glycol, polyethylene glycol, or mixtures thereof. Another group of organic compounds comprising at least two hydroxyl groups and 2-10 carbon atoms per molecule is formed by, e.g., monosaccharides such as glucose and fructose. Compounds built up from these organic compounds include oligomers and polymers, e.g., disaccharides such as lactose, maltose, and saccharose and polysaccharides.

Organic compounds according to (ii) preferably comprise at least two carbonyl moieties. It is preferred that at least one carbonyl moiety is present in a carboxyl group. It is furthermore preferred that at least one nitrogen atom is covalently bonded to at least two carbon atoms. A preferred organic compound satisfies formula (I) or (II)

$$(R1R2)N-R3-N(R1'R2') \quad \text{(I)}$$

$$N(R1R2R1') \quad \text{(II)}$$

wherein R1, R2, R1' and R2' are independently selected from alkyl, alkenyl, and allyl, with up to 10 carbon atoms optionally substituted with one or more groups selected from carbonyl, carboxyl, ester, ether, amino, or amido. R3 is an alkylene group with up to 10 carbon atoms which may be interrupted by —O— or —NR4-. R4 is selected from the same group as indicated above for R1. The R3 alkylene group may be substituted with one or more groups selected from carbonyl, carboxyl, ester, ether, amino, or amido. As has been set out above, it is essential that the organic compound of formula (I) or (II) comprises at least one carbonyl moiety. Preferably, at least two of R1, R2, R1' and R2' (formula (I)) and at least two of R1, R2 and R1' (formula (II)) have the formula —R5-COOX, wherein R5 is an alkylene group having 1-4 carbon atoms, and X is hydrogen or another cation, such as an ammonium, sodium, potassium and/or lithium cation. If X is a multivalent cation, one X can be bound to two or more —R5-COO groups. Typical examples of a compound of formula (I) are ethylene diamine (tetra)acetic acid (EDTA), hydroxyethylene diamine triacetic acid, and diethylene triamine pentaacetic acid. A typical example of a compound of formula (II) is nitrilotriacetic acid (NTA).

One criterion for establishing that a suitable post first-stage impregnated and calcined intermediate composition or post second-stage impregnated and calcined supported catalyst has been obtained is to measure the weight percent loss on ignition (LOI) of the composition or supported catalyst. LOI is a measure of the total volatiles or components capable of being volatilized at elevated temperature that are present in a sample. The components primarily comprise water, but can also include residues or complexes of organic additives introduced during the first-stage impregnation and/ or the organic chelating agent in the second-stage impregnation. The LOI test is conducted by subjecting a sample to an oxygen-containing atmosphere for 1 hour at 1020° F. (548.9° C.), thereby degrading, oxidizing or igniting organic matter and driving off residual moisture to the extent considered appropriate for the stage, as discussed herein. However, the temperature of the LOI test is believed not to be sufficiently high to significantly affect or adversely modify inorganic oxide components that are present, including for example, the inorganic oxide support and/or metal or phosphorus oxides. It is expected that the organic compound present in the PVI impregnation solution will be oxidized and/or volatilized to a degree, but its loss will be targeted to a specific, final LOI level depending on the end-use of the resulting supported catalyst.

The composition resulting from the post-first stage calcination and the composition or supported catalyst resulting from the post-second stage calcination, prepared according to the present invention have LOI values as follows:

TABLE 1

| LOI (wt %) | Post First-Stage Impregnation and Calcination | Post Second-Stage Impregnation and Calcination |
|---|---|---|
| Typical | >0 to 5 | >0 to 30 |
| Target | <1 to 4 | 1 to 20 |
| Preferred | <1 to 2 | 2 to 15 |
| Most Preferred | <1 | 3 to 7 |

The final supported catalyst will typically exhibit an LOI less than about 30 wt %; a target of about 20 wt %, preferably less than about 15 wt %; more preferably less than about 14 wt %; for example from about 2 wt % to about 15 wt %; or about 3 wt % to about 7 wt %.

Furthermore, the LOI value exhibited following second-stage calcining can be affected by the type and amount of the specific organic component or chelating agent included in the PVI solution, as well as the level of moisture present in the composition at the time of impregnation, calcination and afterwards. Consequently, the LOI level in the supported catalyst following the second-stage calcination, summarized in above Table 1 can be achieved using the methods of the present invention, for example, greater than 0 or about 1, 2, 3, 4, 5, 6, 7, 8, 9, 10, 11, 12, 13, 14, or 15 wt % to about 20 or about 30 wt %. Alternatively about 1, 2, 3, 4, 5, 6, 7, 8, 9, 10, 11, 12, 13, 14, or 15 wt % to about 20 wt %; or about 2, 3, 4, 5, 6, 7, 8, 9, 10, 11, 12, 13, or 14 wt % to about 15 wt %; or about 3, 4, 5, or 6 wt % to about 7, 8, 9, or 10 wt %. Overall, it is expected that whatever the LOI level achieved, it will be such that the amount of chelating agent, chelating agent residue or chelated metal complex desired in the supported catalyst composition has not been significantly adversely reduced, either through degradation and/or volatilization as a result of the heating and calcining steps, but that a significant amount, or most if not all, of the residual water present in the wet supported catalyst following second-stage impregnation has been driven off or volatilized.

Hydrocarbon Conversion Processes

The catalysts according to the invention are particularly useful in hydrocarbon conversion processes comprising contacting a hydrocarbon feedstock with a particulate, supported catalyst under conditions of elevated temperature and elevated pressure with hydrogen, wherein the catalyst is made according to the present invention. As generally described, such catalysts comprise at least one catalytically active metal from Group VIB of the Periodic Table, at least one catalytically active metal from Group VIIIB of the Periodic Table, and optionally, but preferably phosphorus and a chelating agent, chelating agent residue or chelated metal complex, wherein the metals, phosphorus and chelating agent, chelating agent residue or chelated metal complex are carried on a foraminous carrier, and wherein the catalyst exhibits a controlled moisture level, as described above.

Supported catalysts prepared according to the present invention can be used in virtually all hydroprocessing processes to treat a plurality of feeds under wide-ranging reaction conditions, generally, for example, at temperatures in the range of about 200° to about 500° C., hydrogen pressures in the range of about 5 to 300 bar, and liquid hourly space velocities (LHSV) in the range of about 0.05 to 10 h$^{-1}$. The term "hydroprocessing" can encompass various processes in which a hydrocarbon feed is reacted with hydrogen at elevated temperature and elevated pressure (hydroprocessing reaction conditions), including hydrogenation, hydrodesulfurization, hydrodenitrogenation, hydrodemetallization, hydrodearomatization, hydroisomerization, hydrodewaxing, hydrocracking, and hydrocracking under mild pressure conditions, which is also referred to as mild hydrocracking.

More specifically, "hydroprocessing" as the term is employed herein means oil refinery processes for reacting petroleum feedstocks (complex hydrocarbon mixtures) with hydrogen under pressure in the presence of a catalyst to lower: (a) the concentration of at least one of sulfur, contaminant metals, nitrogen, aromatics and Conradson carbon, present in said feedstock, and (b) at least one of the viscosity, pour point, and density of the feedstock. In addition, color of the resulting oil may be improved. Hydroprocessing includes hydrocracking, isomerization/dewaxing, hydrofinishing, and hydrotreating processes which differ by the amount of hydrogen reacted and the nature of the petroleum feedstock treated.

Hydrotreating is typically understood to involve the hydroprocessing of predominantly hydrocarbonaceous compounds containing at least five carbon atoms per molecule ("feedstock") for the desulfurization and/or denitrification of said feedstock, wherein the process is conducted: (a) at superatmospheric hydrogen partial pressure; (b) at temperatures typically below 593.3° C. (1100° F.); (c) with an overall net chemical consumption of hydrogen; and (d) in the presence of a solid supported catalyst containing at least one hydrogenation component.

Hydrofinishing is typically understood to involve the hydroprocessing of hydrocarbonaceous oil containing predominantly (by weight of) hydrocarbonaceous compounds in the lubricating oil boiling range ("feedstock") wherein the feedstock is contacted with solid supported catalyst at conditions of elevated pressure and temperature for the purpose of saturating aromatic and olefinic compounds and removing nitrogen, sulfur, and oxygen compounds present within the feedstock, and to improve the color, odor, thermal, oxidation, and UV stability, properties of the feedstock.

Hydrocracking is typically understood to involve the hydroprocessing of predominantly hydrocarbonaceous compounds containing at least five (5) carbon atoms per molecule ("feedstock") which is conducted: (a) at superatmospheric hydrogen partial pressure; (b) at temperatures typically below 593.3° C. (1100° F.); (c) with an overall net chemical consumption of hydrogen; (d) in the presence of a solid supported catalyst containing at least one (1) hydrogenation component; and (e) wherein said feedstock typically produces a yield greater than about one hundred and thirty (130) moles of hydrocarbons containing at least about three (3) carbon atoms per molecule for each one hundred (100) moles of feedstock containing at least five (5) carbon atoms per molecule.

As is well known these feedstocks contain nickel, vanadium, and asphaltenes, e.g., about 40 ppm up to more than 1,000 ppm for the combined total amount of nickel and vanadium and up to about 25 wt. % asphaltenes. Further, the economics of these processes desirably produce lighter products as well as a demetallized residual by-product. This process is particularly useful in treating feedstocks with a substantial amount of metals containing 150 ppm or more of nickel and vanadium and having a sulfur content in the range of about 1 wt. % to about 10 wt. %. Typical feedstocks that can be treated satisfactorily by the process of the present invention contain a substantial amount (e.g., about 90%) of components that boil appreciably above 537.8° C. (1,000° F.). Examples of typical feedstocks are crude oils, topped crude oils, petroleum hydrocarbon residua, both atmospheric and vacuum residua, oils obtained from tar sands and residua derived from tar sand oil, and hydrocarbon streams derived from coal. Such hydrocarbon streams contain organometallic contaminants which create deleterious effects in various refining processes that employ catalysts in the conversion of the particular hydrocarbon stream being treated. The metallic contaminants that are found in such feedstocks include, but are not limited to, iron, vanadium, and nickel.

While metallic contaminants, such as vanadium, nickel, and iron, are often present in various hydrocarbon streams, other metals are also present in a particular hydrocarbon stream. Such metals exist as the oxides or sulfides of the particular metal, or as a soluble salt of the particular metal, or as high molecular weight organometallic compounds, including metal naphthenates and metal porphyrins, and derivatives thereof.

Another characteristic phenomenon of hydrotreating heavy hydrocarbons is the precipitation of insoluble carbonaceous substances or sediment from the asphaltenic fraction of the feedstock which cause operability problems. Sediment can deposit on and inside various pieces of equipment downstream of the hydroprocessing unit and interferes with proper functioning of pumps, heat exchangers, fractionating towers, etc. Production of excessive amounts of sediment is undesirable in that deposition in downstream units typically requires shut-down of equipment to remove the sediment. The amount of such sediment or insolubles formed increases with the amount of material boiling over 537.8° C. (1,000° F.) which is converted or with an increase in the reaction temperature employed. These insoluble substances, also known as Shell hot filtration solids, create the operability difficulties for the hydroconversion unit and thereby circumscribe the temperatures and feeds the unit can handle. In other words, the amount of solids formed limit the conversion of a given feedstock. Operability difficulties as described above may begin to manifest themselves at solids levels as low as 0.1 wt. %. Levels below 0.5 wt. % are generally desired to prevent fouling of process equipment. A description of the Shell hot filtration test is found at A. J. J., Journal of the Inst. of Petroleum (1951) 37, pp. 596-604 by Van Kerkvoort, W. J. and Nieuwstad, A. J. J. which is incorporated herein by reference. Another useful test method for the determination of total sediment is described in ASTM D 4870-92.

The operating conditions for the hydrotreating of heavy hydrocarbon streams, such as petroleum hydrocarbon residua and the like, are well known in the art and comprise a pressure within the range of about 1,000 psia (68 atm) to about 3,000 psia (204 atm), an average catalyst bed temperature within the range of about 700° F. (371° C.) to about 850° F. (454° C.), a liquid hourly space velocity (LHSV) within the range of about 0.1 volume of hydrocarbon per hour per volume of catalyst to about 5 volumes of hydrocarbon per hour per volume of catalyst, and a hydrogen recycle rate or hydrogen addition rate within the range of about 2,000 standard cubic feet per barrel (SCFB) (356 m$^3$/m$^3$) to about 15,000 SCFB (2,671 m$^3$/m$^3$). Preferably, the operating conditions comprise a total pressure within the range of about 1,200 psia to about 2,000 psia (81-136 atm); an average catalyst bed temperature within the range of about 730° F. (387° C.) to about 820° F. (437° C.); and a LHSV within the range of about 0.1 to about 4.0; and a hydrogen recycle rate or hydrogen addition rate within the range of about 5,000 SCFB (890 m³/m³) to about 10,000 SCFB (1,781 m³/m³). Generally, the process temperatures and space velocities are selected so that at least 30 vol. % of the feed fraction boiling above 1,000° F. is converted to a product boiling below 1,000° F., more preferably at least 50 vol. % is converted to a product boiling below 1,000° F., and still more preferably so that at least 70 vol. % of the subject fraction is converted to a product boiling below 1,000° F.

For the treatment of hydrocarbon distillates, the operating conditions would typically comprise a hydrogen partial pressure within the range of about 200 psia (13 atm) to about 3,000 psia (204 atm); an average catalyst bed temperature within the range of about 600° F. (315° C.) to about 800° F. (426° C.); a LHSV within the range of about 0.4 volume of hydrocarbon per hour per volume of catalyst to about 6 volumes of hydrocarbon recycle rate or hydrogen addition rate within the range of about 1,000 SCFB (178 m³/m³) to about 10,000 SCFB (1,381 m³/m³). Preferred operating conditions for the hydrotreating of hydrocarbon distillates comprise a hydrogen partial pressure within the range of about 200 psia (13 atm) to about 1,200 psia (81 atm); an average catalyst bed temperature within the range of about 600° F. (315° C.) to about 750° F. (398° C.); a LHSV within the range of about 0.5 volume of hydrocarbon per hour per volume of catalyst to about 4 volumes of hydrocarbon per hour per volume of catalyst; and a hydrogen recycle rate or hydrogen addition rate within the range of about 1,000 SCFB (178 m³/m³) to about 6,000 SCFB (1,068 m³/m³).

Optionally, supported catalysts of the invention may be subjected to sulfiding, sulfidation or a sulfidation treatment to convert components of the supported catalyst, particularly the metal components, to their sulfides. In the context of this disclosure, the phrases "sulfiding" and "sulfidation" are meant to include any process step or steps in which a sulfur-containing compound or composition is brought into contact with the supported catalyst and in which at least a portion of the metal components present on or in the catalyst is converted to a sulfide form, either directly or as a consequence of activation or reaction in the presence of hydrogen. Suitable sulfidation processes are known in the art. Sulfidation can take place ex situ to one or more reactors in which the supported catalyst is to be used to hydrotreat hydrocarbon feeds, in situ, or in a combination of steps or processes ex situ and in situ to the reactor.

Ex situ sulfidation processes typically take place outside the reactor in which the supported catalyst is to be used to hydrotreat hydrocarbon feeds. In such a process, the supported catalyst is contacted with a sulfur containing composition and/or one or more sulfur compounds, e.g., a polysulfide or elemental sulfur, outside the reactor and, if necessary, dried. In a typical second step, the initially treated supported catalyst is treated further with hydrogen gas at elevated temperature in a reactor, optionally in the presence of a hydrocarbon feed, to activate the catalyst, in other words, to bring the supported catalyst into a sulfided state.

On the other hand, in situ sulfidation processes take place in the reactor in which the supported catalyst is to be used for hydrotreating a hydrocarbon feed. In so doing, the supported catalyst is contacted in the reactor at elevated temperature with a hydrogen gas stream mixed with a sulfiding agent, such as hydrogen sulfide, or a compound which under the prevailing reaction conditions is decomposable into hydrogen sulfide, such as dimethyl disulfide. Alternatively, a hydrogen gas stream can be contacted or combined with a hydrocarbon feed comprising a sulfur compound, which under the prevailing conditions, is decomposable into hydrogen sulfide. In the latter case, it is possible to sulfide the supported catalyst by contacting it with a hydrocarbon feed comprising an added sulfiding agent (referred to as a spiked hydrocarbon feed), and it is also possible to use a sulfur-containing hydrocarbon feed without any added sulfiding agent, since sulfur components typically present in the feed will be converted into hydrogen sulfide in the presence of the supported catalyst. Combinations of the various sulfiding techniques may also be applied. The use of a spiked hydrocarbon feed is sometimes preferred.

Summary of Supported Catalyst Preparation Method

The inventive method comprises impregnation steps comprising two main stages. In a preliminary process, an inorganic oxide suitable for use in the hydroprocessing process in which the supported catalyst is to be used is mixed with water or an aqueous composition comprising an acid so as to form an extrudable composition (also referred to as the target extrudate). The target extrudate is extruded to form a shape suitable for the use in the hydroprocessing process, such extruded shape also described herein as a "pill". The pill is then dried, typically including being calcined to form a dry target extrude.

In the first stage, the dry target extrudate is impregnated with a solution comprising a boron source (for example, boric acid) and an inorganic compound selected from those described herein (for example, citric acid). The resulting first-stage or intermediate impregnated composition is subjected to a first stage calcination process at a temperature and for a time so as to significantly reduce its moisture content. Following calcination, the intermediate can exhibit, for example, a measured loss on ignition (LOI) level of greater than 0 wt % to less than about 5 wt %; the first-stage calcining process sometimes referred to herein as a "full burn". Consequently, it is believed that most, if not all, of the organic compound will be degraded and thus volatilized from the impregnated first-stage composition along volatilizing most, if not all, moisture (the extent of volatilization being measured and characterized by the LOI value) and the boron source being converted to $B_2O_3$.

In a second-stage, the intermediate boron-containing inorganic oxide from the first-stage undergoes a second impregnation, with a metals-containing solution comprising targeted, catalytically active metals and other optional or preferred components potentially beneficial to catalysis in the intended hydroprocessing process, including, optionally, but preferably phosphorus. After the second impregnation, the composition is subjected to a second calcination process, under less intense temperature and/or time compared to the first, such that the resulting composition preferably exhibits an LOI of about 2 to about 15 wt %, or about 3 to about 7 wt %, for example about 5 wt %, in what is sometimes referred herein to as a "partial burn".

Stepwise Summary of the Preparative Method

1. Select an inorganic oxide (optionally including mixtures of inorganic oxides, e.g., alumina plus silica or silica-alumina) for impregnation based on the supported catalyst needed in a hydroprocessing process, referred to hereinafter as the "extrudate". The extrudate will have been preliminarily prepared by mixing the selected inorganic oxide(s) with water and optionally an acid such as nitric acid, extruding the mixture so as to form a pill of desired shape and calcining the pill to form the extrudate.

2. Determine the types and concentrations of metals present in the extrudate, if any, its LOI, and water pore volume.

3. Weigh out the desired amount of extrudate from step 1.

4. Select target weight percent for $B_2O_3$.

5. Convert the target weight percent to a mass quantity of $B_2O_3$.

6. Convert the mass quantity of $B_2O_3$ to a mass quantity of $H_3BO_3$ (if boric acid is the boron source being used) by multiplying by a conversion factor of 0.566.

7. Calculate the total water required to fill the pores of the total amount of dry inorganic oxide based on measuring the nitrogen pore volume of the inorganic oxide; this quantity also represents the maximum amount of water available for boron dissolution.

8. Calculate the amount of the selected organic compound, e.g., citric acid required to dissolve the selected boron source compound. Typically, a simple preliminary dissolution test at a selected temperature, e.g., 100° F. (37.8° C.) will establish the amount required to obtain an aqueous solution of a given combination of organic compound and type and amount of boron source. For example, it has been determined that using a combination of citric acid and boric acid, the amount of citric acid required to dissolve boric acid at about 100° C. is about 5.14 times the mass quantity of boric acid.

9. Add the measured amounts of boron source (e.g., boric acid) and organic compound (e.g., citric acid) into a 200 mL beaker and dilute the contents with the calculated amount of water.

10. Add a watch glass and a stir bar to the beaker and begin agitation.

11. Gently heat the solution on a hot plate to a temperature that is no higher than 110° F. until the solution is clear.

12. Perform a standard pore volume impregnation (PVI) for the first-stage by adding 200 g of the extrudate (dry basis) and the (boric acid/citric acid) solution from step 11 to a plastic quart container and seal the container.

13. Rotate the container on a tumbler for about 1 hour and while rotating, periodically check the contents to ensure the mixture is wet and, if necessary, add a small amount of water (a dry appearance indicates that a small amount of water needs to be added to insure that the pores of the extrudate are filled).

14. Remove the container from the tumbler, remove the lid, and let stand for about 1 hour.

15. Prepare a rotary calciner by cleaning the calcining tube and determining suitable calcining conditions to effect a "full burn" for the first stage in order to achieve the selected LOI, for example, an LOI of about 1 wt %.

16. As an example, a suitable calcination program can begin at 250° F. with a 10 min hold, an increase to 950° F. over a 40 min span, and a dwell at 950° F. for 40 min. For such a program, the calcining tube should initially be preheated to 250° F. before the program is run.

17. Add the impregnated material from step 14 to the calciner tube, initiate a suitable air flow, for example, 8 SCFM, and run the calcination program.

18. After conclusion of the calcination program, allow the boron-containing intermediate to cool completely and measure the LOI to confirm that the target LOI level has been achieved, e.g., as noted about 1 wt %.

19. Select the target catalytic metals and optionally phosphorus for the supported catalyst and prepare a solution containing the metals (and phosphorus) for the second-stage PVI.

20. Perform the second-stage PVI in the same manner as described in steps 12-14.

21. Select and set a second calcination program as needed for a "partial burn" in order to reach the targeted LOI, for example, about 5 wt %. For example, a suitable second-stage calcination program to achieve an LOI of about 5 wt % can begin at to 320° F. with a 10 min hold, an increase to 670° F. over a 40 min span, and a dwell at 670° F. for 10 min.

22. Add the impregnated material from step 20 to the calciner tube, initiate a suitable air flow, for example, 8 SCFM, and run the calcination program.

23. Remove the impregnated catalyst quickly after calcination and measure its LOI to confirm achieving the target LOI, for example, about 5 wt %.

It has been surprisingly found that following the first-stage pore volume impregnation with a boron source and organic compound followed by a "full burn", the pore size distribution (PSD) of the modified inorganic porous oxide, referred to as the "post-first PVI" intermediate, contains a peak in the distribution at 60 Å that didn't exist in the original inorganic oxide. Even more surprising, the peak at 60 Å is no longer present when the PSD is again measured after the supported catalyst is formed following the second PVI and "partial burn", also referred to as the "post-second PVI" product or the supported hydroprocessing catalyst of the present invention. (See FIG. 1)

Compositional Effects of the Supported Catalyst Preparative Method

As will be demonstrated in the examples that follow, the two-stage preparative method as described herein, results in a supported hydroprocessing catalyst having unexpectedly superior catalytic performance. Furthermore, careful analysis of the supported catalyst has also revealed an unexpected effect on the distribution of at least some of the catalytic metals and phosphorus in the supported catalytic particles or pills. Rather than the metals and phosphorus being uniformly distributed throughout the particle, the distribution is inhomogeneous such that there is a greater concentration of the Group VIB metal or metals and phosphorus at and adjacent to the outer surface of the particle and a lower concentration in the center of the particle.

An example of elemental compositional distributional non-uniformity in a supported catalyst pill prepared according to the present invention is graphically represented in FIG. 2, which illustrates a representative metal concentration of a cross-section through an extrudate pill or particle using Electron Probe Microanalysis (EPMA) according to the test procedure described hereinafter. In EPMA, a target sample, in this case a piece of extrudate that has been sectioned horizontally in half, is bombarded with a focused electron beam that moves across the sample (from position 0 to position 1 in FIG. 2), emitting X-rays that correlate to selected specific elements. In an EPMA plot, such as the representative plot in FIG. 2, the x-axis represents position across the pill and the y-axis represents the relative intensity and thus the concentration of a specific element. Also illustrated in FIG. 2 is an electron photomicrograph of a cross-section through an asymmetric quadrilobal shaped supported catalyst extrudate particle or pill identifying lengthwise longitudinal positions from one lobe edge (0) to the other (1). In the figure, the particle has a quadrilobal shape although the same effect is expected for other extrudate particle or pill shapes. As shown in the representative EPMA plot, the method allows determination when there is significant non-uniform metal concentration distribution from one outer edge of the particle, along the center line through the pill, to the opposing outer edge of the pill.

EPMA is capable of mapping the spatial distribution of major and minor elements within solid samples and it has been so applied herein with respect to supported catalyst pills or particles. In general, a sample is tested by embedding it in a resin or polymer matrix and polishing it to yield a flat surface. Calibration is performed against mineral standards. The test provides a combination of elemental mapping with high-resolution imaging within an electron microscope.

The observed, measured concentrations have also been converted to numerical values, as reported in the tables associated with the examples described hereinbelow. The unexpected concentration distribution has been observed for Group VIB metal oxides including molybdenum and tungsten oxide as well as for phosphorus oxide ($P_2O_5$). In contrast, the Group VIIIB metal oxides used in combination with the Group VIB metal oxides and phosphorus oxide (when present), have not been so inhomogeneously distributed, which is also shown in the figures and in the data reported with the examples. The following ranges of values for the distribution of Group VIB metal oxides and phosphorus oxide along a centerline through a cross-section of a supported catalyst particle are expected when the method according to the invention is practiced:

TABLE 2

| Component | Position in Pill, Distance Along Centerline, % Region (0-33.3) vs. (33.3-66.6) vs. (66.6-100) | |
| | Group VIB Metal Oxide | $P_2O_5$ |
| --- | --- | --- |
| Relative Concentration Difference | Δ (First ⅓ and Central ⅓)* | |
| Preferred | 20 to 100 | 30 to 350 |
| Alternatively Preferred | 30 to 95 | 50 to 300 |
| | Region Along Centerline of Pill Cross-section Δ (Last ⅓ and Central ⅓)* | |
| Preferred | 20 to 100 | 30 to 350 |
| Alternatively Preferred | 25 to 75 | 35 to 300 |

*Δ = relative difference by which the identified section exceeds the central section, %

Improved Catalytic Activity

As described above, practicing the method of the invention results in a supported catalyst that exhibits improved catalytic activity when the catalyst is employed in hydroprocessing processes. It is common in the art to express catalyst activity in degrees F. (° F.) for the following reason. When the supported catalyst is employed in a hydroprocessing process for the removal of sulfur or nitrogen, the level of sulfur or nitrogen in the treated hydrocarbon product is measured as a function of the operating temperature of the process; operating at a higher temperature results in a lower content of sulfur or nitrogen in the treated product, but doing so comes at the expense of higher cost to operate at the higher temperature. Plotting sulfur or nitrogen content achieved against operating temperature results in graphs that are referred to as S-T or N-T plots, and performance is interpolated to a specific sulfur or nitrogen target. Considering the practical difficulty that would be encountered to evaluate catalyst performance in a full-scale industrial facility, catalyst performance is typically evaluated in a pilot plant and at three different temperatures in order to generate a linear regression of performance in a S-T or N-T plot. For example, evaluating catalyst performance in a process for producing ultra-low sulfur diesel (ULSD) applications, corresponding to the evaluation process reported in the examples, a typical target would be achieving a concentration of 10 ppm S or 10 ppm N in the product using a supported catalyst.

Figure 3:
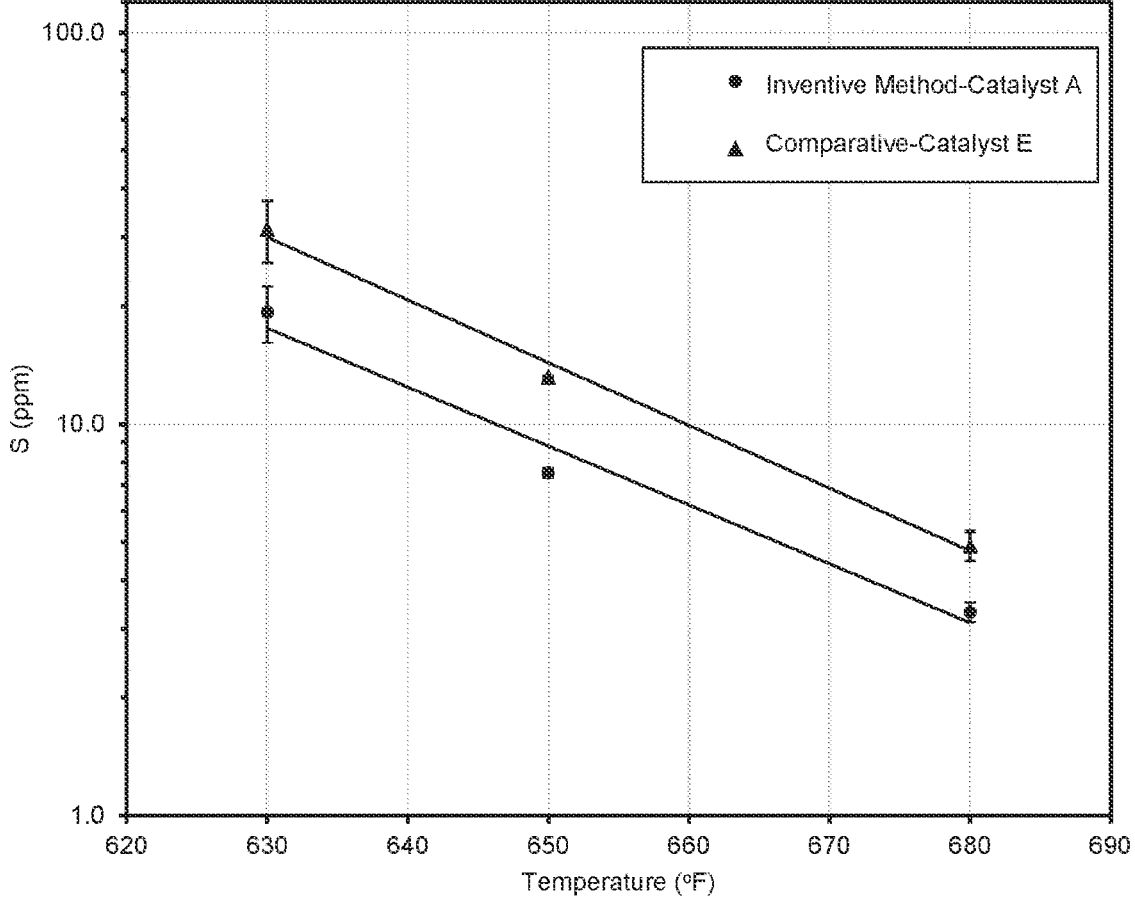
FIG. 3 is a graph showing sulfur in liquid hydrotreated diesel product as a function of temperature using inventive and comparative supported catalysts.

Referring to FIG. 3, in order to obtain a treated diesel product containing a reduced sulfur content of 10 ppm S, using typical a prior art ("comparative") Mo/Co-containing catalyst B (corresponding to supported catalyst E in Table 7 below), it is necessary to operate the pilot plant at a temperature of 660° F. (348.9° C.). In contrast, using a supported Mo/Co-containing catalyst prepared according to the inventive method disclosed herein, it is only necessary to operate the pilot plant at about 646° F. (341.1° C.) in order to achieve the same reduced level of 10 ppm S. Therefore, improved catalytic activity for the supported catalyst of the invention can be expressed as the difference between 660° F.–646° F.=14° F. more active than a prior art catalyst in a typical hydrodesulfurization process. Catalyst performance reported in the examples herein is similarly expressed in terms of ° F.

There are alternative ways of expressing the improvement, such as percent removal of S or N, although for processes to produce ULSD the degree of removal is always well above 90% and thus relative changes in percentage removal may be subject to significant variability due to the low levels of remaining S or N. Alternatively, relative changes in the HDS or hydrodenitrogenation (HDN) rate constants could be used, or relative volume activity. However, describing the improvement in terms of degrees F. is preferred so that the improvement can be reported as X° F. better than the reference supported catalyst.

Furthermore, to a person skilled in the art, an improvement of 5° F. is typically what separates a new or improved supported catalyst from an existing catalyst and achieving such an improvement would be expected to require significant research effort, perhaps years of work. Achieving an even greater improvement of 10° F. is considered by those skilled in the art as an even more significant leap forward, but to do so can require several years of research and development. Anything above 10° F. is considered a major improvement. Hence, as will be observed in the examples reported herein, supported catalysts produced according to the inventive method have exhibited at least a 14° F. improvement in performance, which was surprising and unexpected. To summarize, it has been observed that supported catalysts can be produced according to the inventive method exhibiting improved catalyst performance defined as disclosed above, from 5° F. to as much as 26° F.; alternatively from 6° F. or from 7° F., from 8° F., from 9° F., from 10° F., from 11° F., from 12° F., from 13° F., to 26° F., or to 25° F., to 24° F., to 23° F., to 22° F., to 21° F., to 20° F., to 19° F. to 18° F., to 17° F., to 16° F., to 15° F., to 14° F., to 13° F., to 12° F., or to 11° F.; including each of the ranges represented by the intervening and combination of values just mentioned.

Test Methods

Loss on Ignition (LOI)

LOI is a measure of the total volatiles present in a sample such as a porous inorganic oxide or such an oxide impregnated with various additives, including a catalyst composition supported on an inorganic oxide or precursor or intermediate of such catalyst. Volatiles are believed to comprise or consist essentially of water and thermally and/or oxidatively degradable organic components or residues. For purposes of the present disclosure, the LOI test is conducted by subjecting a sample to an oxygen-containing atmosphere for 1 hour at 1020° F. (548.9° C.), thereby oxidizing, degrading or igniting organic matter and driving off such matter as well as most, if not all, residual moisture in the catalyst.

Electron Probe Microanalysis (EPMA)

EPMA combines the imaging capability of a focused electron beam with the analytical potential afforded by induced X-rays to produce spatially resolved analyses of a wide range of elements with a detection limit of about 100 mg kg$^{-1}$. EPMA is capable of mapping the spatial distribution of major and minor elements within solid samples and it has been so applied herein with respect to supported catalyst pills or particles. In general, samples being tested are embedded in a resin or polymer matrix and polished to yield a flat surface. Calibration is performed against mineral standards. The test provides a combination of elemental mapping with high-resolution imaging within an electron microscope.

Sample preparation: For imaging and scanning a sample cross section, samples were placed in an epoxy resin, and the resin was cured overnight at room temperature. The sample stub was then cut with a diamond blade, and polished to a smooth surface using 6 micron and 0.25 micron diamond pastes. For better conductivity, a thin carbon coating was applied to the sample stub.

EPMA Test Procedure: Line scanning for the sample cross section (from the end of one lobe to the end of the opposite lobe) was performed with JEOL JXA-8230 Electron Probe MicroAnalyzer (EPMA) equipped with four wavelength dispersive spectrometers (WDS) at 25 kV and 20 nA. PET crystal was used for detection of P and Mo, TAP for W, and LiF for Ni. Dwell time was 500 millisecond, and step size was about 1 micron.

EXAMPLES

In the following examples, porous inorganic oxide support particles were prepared from a mixture of alumina, 2 to 4 wt % silica, water and a small amount of nitric acid, which mixture was extruded and calcined (to a moisture level of about 5 wt %) in order to prepare porous particles or pills in the asymmetric quadrilobal shape shown in FIG. 2, which is also referred to hereinabove as the "extrudate", for subsequent processing according to the method disclosed herein. The extrudate exhibited the following properties: surface area (SA)=200–300 m$^2$/g; and pore volume=0.7–1.0 cc/g. Compositions produced in a commercial, semi-commercial or pilot plant setting, it is typical for recycled catalyst fines to be included with an alumina and/or alumina plus silica mixture. Thus, it is to be expected that a minor amount of Group VIB, Group VIIIB and/or phosphorus can be present in a preliminary or intermediate catalyst composition. However, measurement of the metals or metal oxides in such intermediate compositions allows for adjustment of the additional amounts of metal and phosphorus compounds in order to achieve the final or target concentrations desired for the final catalyst. Conversely, the presence of a minor amount of a metal oxide other than those targeted for the final catalyst (for example, less than 1 wt % nickel oxide in a molybdenum oxide plus cobalt oxide catalyst) has not been shown to be detrimental to the final performance of the catalyst or to meaningfully affect catalyst performance.

Example 1

Components for preparing the first-stage support described above used the extrudate described immediately above, H$_3$BO$_3$ (boric acid) as the boron source, citric acid as the organic compound in the first stage, and Co and Mo as the catalytic metals in the second stage impregnation. 200 g of extrudate (on a dry basis, i.e., adjusting for the amount of moisture) was weighed out; the target weight percent of B$_2$O$_3$ was selected as 3.0 wt %; and the corresponding mass quantity of B$_2$O$_3$ required was calculated as 6.19 g. The mass quantity of B$_2$O$_3$ was converted to a mass quantity of H$_3$BO$_3$ by multiplying by a conversion factor of 0.566, which resulted in 10.9 g of H$_3$BO$_3$ being required. The total pore volume of the extrudate based on nitrogen pore volume recited above, established the maximum volume and amount of water available for boron dissolution. Pore volume was determined to be 0.8 cc/g, which was multiplied by 200 g of the dry extrudate resulting in 160 cc of required water. The amount of citric acid required to dissolve the calculated amount of boric acid was separately determined as 5.14 times the mass quantity of boric acid, which equaled 56.03 g of citric acid. In subsequent examples wherein a different organic acid was used in place of citric acid (e.g., acetic, malic, etc.), the same molar ratio of carboxylic acid to boric acid was used.

The above amounts of boric acid and citric acid were added to a 200 mL beaker and diluted with the calculated amount of water. A watch glass and stir bar were added to the beaker and the contents were stirred while gently heating the contents to a temperature no higher than 110° F. (43.3° C.) until a clear solution was obtained.

The first-stage pore volume impregnation (PVI) was carried out by adding 200 g of extrudate (dry basis) and the boron/citric solution to a plastic quart container, which was rotated on a tumbler for 1 hour. During that time, the contents were periodically checked to ensure the mixture was wet and, when necessary, a small amount of water was added as needed to insure that the pores of the extrudate were filled. The container was removed from the tumbler and the lid was removed from the container, which was allowed to stand for 1 hour.

A rotary calciner was prepared by cleaning a calcining tube and preheating it to 250° F. (121.1° C.). The calcination program was set to achieve an LOI of the calcined composition of about 1 wt % as follows: initial temperature of 250° F. (121.1° C.) with a 10 min hold, followed by an increase to 950° F. (510° C.) over a 40 min span, and finally to a dwell or holding period at 950° F. (510° C.) for 40 min. The impregnated material was added to the calciner tube, air flow was initiated at 8 SCFM, and the calcination program was run. After conclusion of the program, the first stage calcined composition was cooled to about ambient temperature and its LOI was measured to confirm that it was about 1 wt %.

The metals solution containing Co and Mo (or Ni and Mo in Ex. 3 below) for the second-stage PVI was prepared and PVI impregnation was performed in the same manner as described above for the first-stage impregnation. The target wt % amounts for the solutions are summarized in the following table:

TABLE 3

| Catalyst Component | Example | |
| --- | --- | --- |
| | ½ Target Wt % | 3 Target Wt % |
| MoO$_3$ | 27.0 | 27.0 |
| CoO | 4.7 | 0 |
| NiO | 0 | 6.0 |
| P$_2$O$_5$ | 1.7 | 6.0 |

The second-stage calcination program was set to achieve an LOI of the calcined composition of about 5 wt % as follows: initial temperature of 320° F. with a 10 min hold, followed by an increase to 670° F. over a 40 min span, and finally to a dwell or holding period at 670° F. for 10 min. The second stage impregnated material was added to the calciner tube, air flow was initiated at 8 SCFM, and the calcination program was run. Following calcination, the catalyst was quickly removed and the LOI measured to confirm that the limited or partial burn achieved the target LOI of about 5 wt %.

A reference or control support (CS) sample corresponding to Ex. 1 was also prepared, except there was no first-stage impregnation with boron and citric acid and no first-stage calcining. Thus, a boron-containing composition was not produced.

The chemical composition of the resulting supported catalyst is shown in Table 4 following Ex. 3, below. Pore size distributions of the extrudate, the first-stage boron impregnated inorganic oxide, and the final supported catalyst are shown in FIG. 1.

Example 2

Example 1 was repeated in order to demonstrate reproducibility of the method for preparing the catalyst and performance activity of the resulting catalyst. The chemical composition of the resulting supported catalyst is shown in Table 4 following Ex. 3, below.

Example 3

The catalyst of example 3 was prepared in the same way as in Examples 1 and 2, except the target catalytic metals were Ni and Mo. A control sample was also prepared in the same way except that no boron was added and thus a first-stage PVI was unnecessary. The chemical compositions of the resulting supported catalysts of Examples 1-3 are shown in the following table.

TABLE 4

| Catalyst | | Control Support (CS)* | CS + B Post-First PVI | CS + B Post-Second PVI ** |
|---|---|---|---|---|
| Metals (wt %) | $MoO_3$ | 2.6 | 2.5 | 27.0 |
| | CoO | 0 | 0 | 4.4 |
| | NiO | 0.60 | 0.59 | 0.47 |
| | $P_2O_5$ | 0.59 | 0.58 | 1.9 |
| | $SiO_2$ | 2.1 | 2.2 | 1.5 |
| | $B_2O_3$ | 0 | 3.0 | 2.0 |
| BET SA ($m^2/g$) | | 233 | 246 | 133 |
| $N_2$ PV (cc/g) | | 0.77 | 0.72 | 0.43 |
| LOI (%) | | 5.5 | 1.8 | 5.7 |

*A commercial alumina plus silica inorganic oxide support and including process fines from production of a supported catalyst corresponding to the composition of Example 1 without added boron.
**Inventive Composition
SA = Surface Area;
PV = pore volume;
LOI = Loss on Ignition A comparison of catalyst composition and properties for Examples 1 and 2 (Co/Mo catalysts) and the control and Example 3 (NiMo catalysts) are summarized in following Table 5. The Co/Mo and Ni/Mo inventive examples were designed to be compositionally similar to corresponding control formulations. Essentially, the only difference between the inventive and control examples is the two-stage PVI incorporation of B as described herein for the inventive examples.

TABLE 5

| | Catalyst | | | | |
|---|---|---|---|---|---|
| | CS + B (Mo/Ni/P) | CS (Mo/Ni/P) | CS (Mo/Co/P) | CS + B (Mo/Co/P) | CS + B (Mo/Co/P)* |
| | | | Description | | |
| | B + citric acid PVI; calcined; metals PVI; calcined | Metals PVI; calcined; no B | Metals PVI; calcined; no B Reference | B + citric acid PVI; calcined; metals PVI; calcined | B + citric acid PVI; calcined; metals PVI; calcined |
| | Inventive Method (Mo/Ni) | Baseline (Mo/Ni) | Baseline (Mo/Co) | Inventive Method (Mo/Co) | Inventive Method Mo/Co)* |
| | | | Component | | |
| $MoO_3$, (wt %) | 25.68 | 25.81 | 27.6 | 27.0 | 25.9 |
| NiO, (wt %) | 5.55 | 6.21 | — | 0.47 | 0.45 |
| CoO (wt %) | 0.01 | 0.01 | 4.7 | 4.4 | 4.2 |
| $P_2O_5$, (wt %) | 6.04 | 7.03 | 2.0 | 1.9 | 1.9 |
| $SiO_2$, (wt %) | 1.39 | 1.84 | 1.6 | 1.5 | 1.4 |
| $B_2O_3$, (wt %) | 1.85 | 0 | 0 | 2.0 | 2.0 |
| | | | Property | | |
| BET SA ($m_2/g$) | 145 | 152 | 141 | 133 | 132 |
| $N_2$ PV (cc/g) | 0.37 | 0.38 | 0.44 | 0.43 | 0.44 |
| 4V/A (Å) | 120 | 125 | — | — | — |
| CBD (g/cc) | 0.81 | 0.82 | 0.82 | 0.84 | 0.84 |
| LOI (%) | 5.9 | 7.3 | 5.0 | 5.7 | 3.0 |

Figure 4:
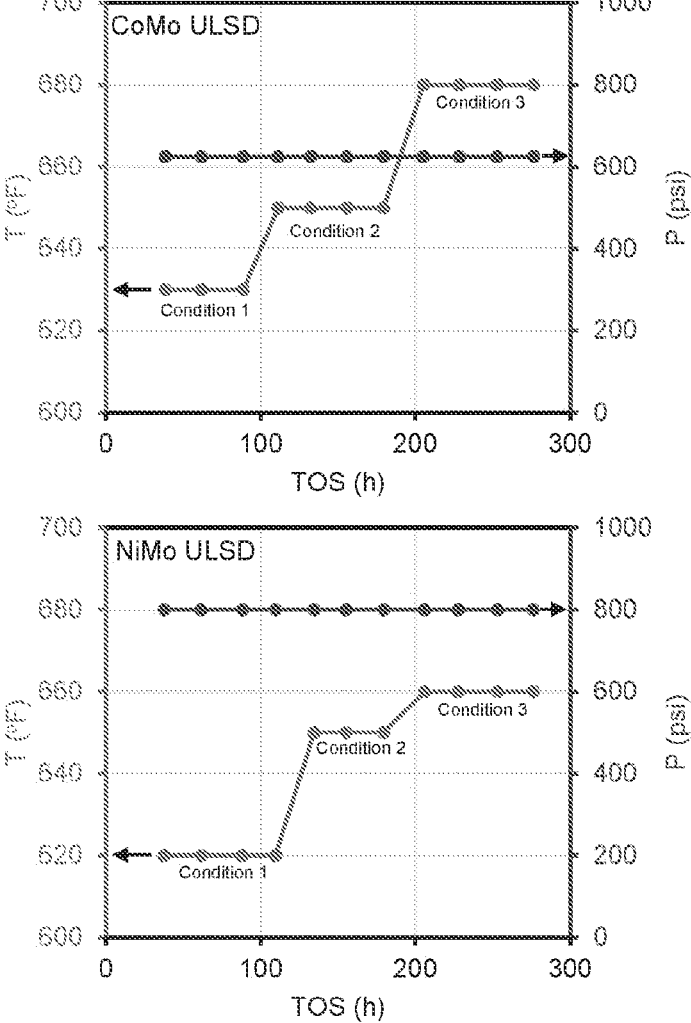
FIG. 4 identifies temperature and pressure test conditions for evaluating supported catalyst HDS and HDN activity.

BET SA = surface area determined using BET method;
$N_2$ PV = nitrogen pore volume;
4V/A = avg. pore diameter in angstroms;
CBD = compacted bulk density
*Repeat The catalytic activity of the above samples was evaluated in a performance testing laboratory according to an ultra-low sulfur diesel (ULSD) testing protocol using a laboratory blended diesel feed. The temperature and pressure conditions for the two-week testing protocol are shown in FIG. 4; "TOS (h)" in the figures means "time on stream" or hours that the test unit is running. As will be observed, three different temperature conditions were used and these conditions are referred to in the figures that follow; different temperature and pressure conditions were used for the CoMo containing catalysts versus the NiMo catalysts. The characteristics of the blended diesel feed for the CoMo and NiMo formulations are shown in following Table 6.

TABLE 6

| ULSD Performance Testing Protocols | |
|---|---|
| Co/Mo Catalyst-ULSD Activity Testing Protocol | |
| Feed | Laboratory Diesel Blend |
| | API: 30.6 |
| | S: 0.88 wt % |
| | N: 289 wppm |
| LHSV (h$^{-1}$) | 1.00 |
| H2/Oil (SCF/BBL) | 1,500 |
| Ni/Mo Catalyst-ULSD Activity Testing Protocol | |
| Feed | Laboratory Diesel Blend |
| | API: 33.1 |
| | S: 1.41 wt % |
| | N: 300 wppm |
| LHSV (h$^{-1}$) | 2.00 |
| H2/Oil (SCF/BBL) | 2,200 |

The inventive catalysts of examples 1 and 2 were compared to the CS control or reference ("baseline") catalyst identified in above Table 5 as Baseline (Mo/Co), and the inventive catalyst of Example 3 was compared to the CS control or reference catalyst identified in above Table 5 as Baseline (Mo/Ni) for performance testing and to compare properties. For both the Co/Mo and Ni/Mo compositions, hydrodesulfurization (HDS) and hydrodenitrogenation (HDN) activities were calculated by determining S and N contents, respectively, in the units' liquid products on daily intervals. Kinetic regressions were performed to determine activity compared to the control or reference catalyst. Differences in HDS activity were expressed in terms of degrees Fahrenheit (° F.) and normalized at 10 ppm S. Differences in HDN activity were expressed in terms of percent improvement compared to the control or reference (baseline) catalysts at each temperature condition.

Figure 5:
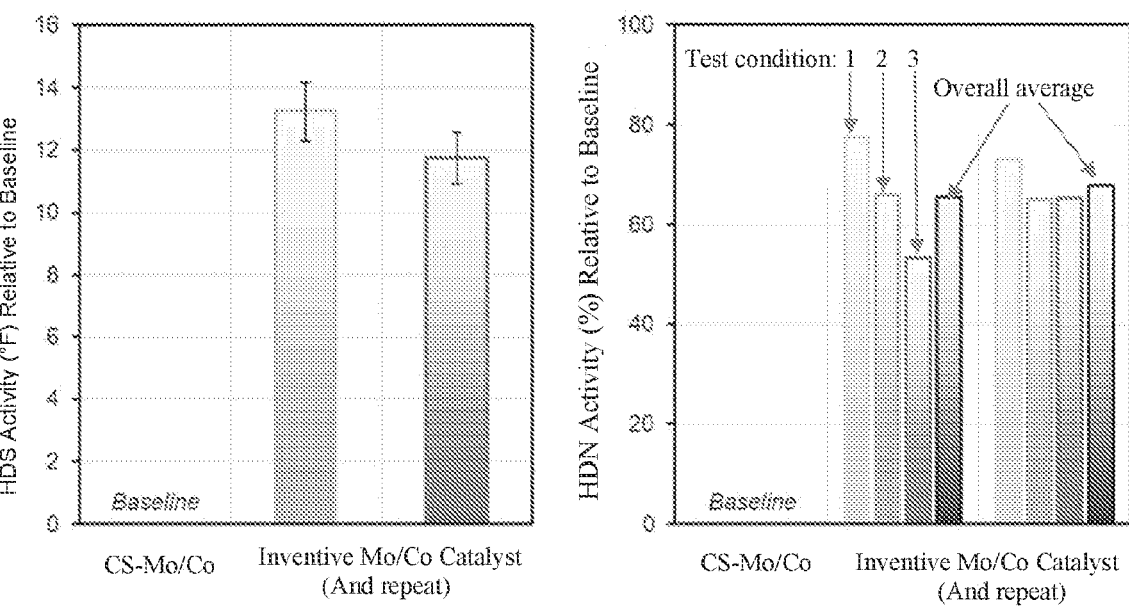
FIG. 5 illustrates HDS and HDN activity of baseline and inventive Mo/Co supported catalysts under various test conditions.
Figure 6:
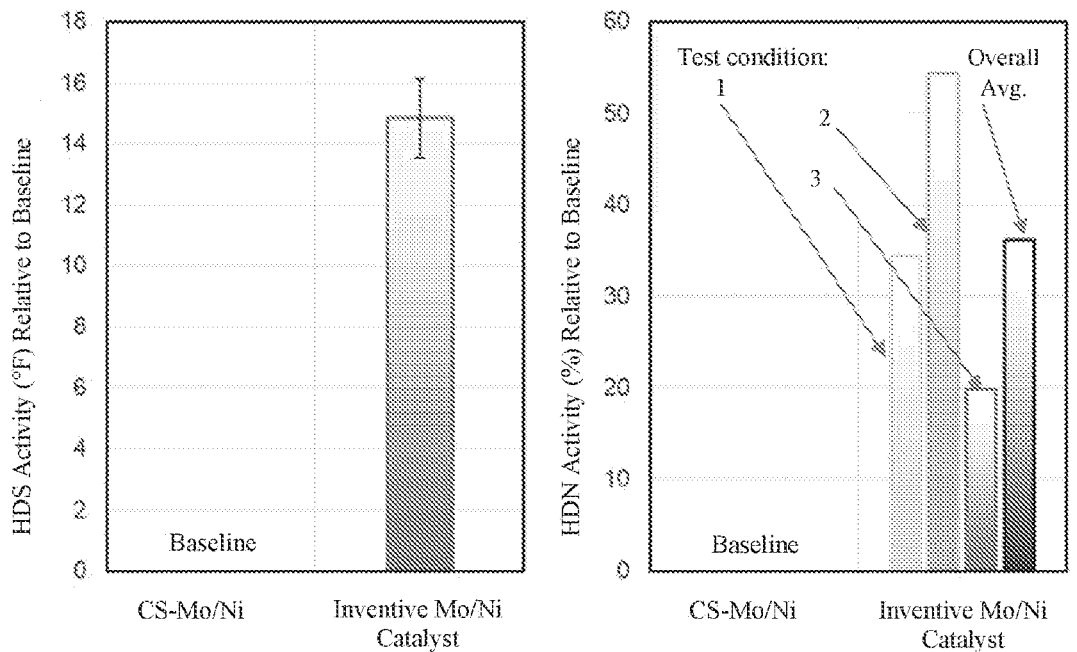
FIG. 6 illustrates HDS and HDN activity of baseline and inventive Mo/Ni supported catalysts under various test conditions.

Activity data presented in FIG. 5 and FIG. 6 clearly demonstrate the advantages of the inventive method comprising two-stage impregnation for B incorporation. Incorporation of B via the method described in this disclosure produced higher-activity supported catalysts for both Co/Mo-containing and Ni/Mo-containing distillate hydrotreating (DHT) compositions when tested under several different conditions. In these tests, the inventive catalyst composition identified in Table 5 above as Inventive Method (Mo/Co) and its repeat, Inventive Method (Mo/Co)*, exhibited improvements of about 12° F. in terms of HDS activity and exhibited about 50% improved HDN activity compared to its reference or control catalyst, identified as Baseline (Mo/Co) in above Table 5 (catalysts comprising Mo and Co). Inventive catalyst identified as Inventive Method (Mo/Ni) in Table 5 above exhibited about 15° F. better HDS activity and about 30% better for HDN activity compared to the control or reference catalyst identified as Baseline (Mo/Ni) in Table 5 above (catalysts comprising Mo and Ni). See FIG. 6.

COMPARATIVE EXAMPLES

Comparisons to Alternative Technologies

The following CoMo-containing catalysts were prepared to compare alternative methods of incorporating boron into hydroprocessing catalysts in order to compare such methods to the inventive method as disclosed herein and illustrated in the above examples. In each instance, the control support base, CS, refers to the support identified and characterized in Table 5 above. Additionally, a support comprising a mixture of alumina and silica has also been used for comparison. The following methods were compared:

A. CS/B+CA PVI on Support; 1$^{st}$ Stage Calcination; Metals PVI, 2$^{nd}$ Stage Calcination Inventive method as disclosed herein.

B. CS/Metals Solution→B-CA

The support was first impregnated with the metals solution, the resulting intermediate composition was calcined using a "full burn" as described above, thereafter the resulting metals impregnated support was further impregnated with a solution containing boron and citric acid, and the resulting impregnated composition was calcined using a "partial burn", also as disclosed hereinabove. The resulting supported catalyst was tested to determine effects of the order impregnation of boron on catalyst performance.

C. CS/MetalsSolution+B

The CS base was impregnated with a Co/Mo metals solution containing citric acid and as much boric acid as could be dissolved before causing the solution to destabilize. This produced a supported catalyst containing about 0.7 wt % B$_2$O$_3$, the maximum possible amount achievable via this impregnation approach.

D. Alumina+Silica–Alumina+B/Metals Solution

In this method, boric acid was added to alumina and a silica-alumina additive (at 25 wt %) using an indirect heat exchanger that utilizes a hollow screw for heating, cooling or drying of, e.g., bulk solids (a commercial version of this technology is the Holo-Flite® Thermal Processor). This extrudate was then impregnated with the same metals solution as for the inventive composition and the resulting impregnated catalyst was calcined via a partial burn. This method was employed to contrast the effect of adding boron in a mixing or kneading process compared to impregnating boron as a component of an impregnating solution.

E. Metals Solution/CS

Metals solution impregnated on support followed by calcination; no boron or citric acid added.

Figure 7:
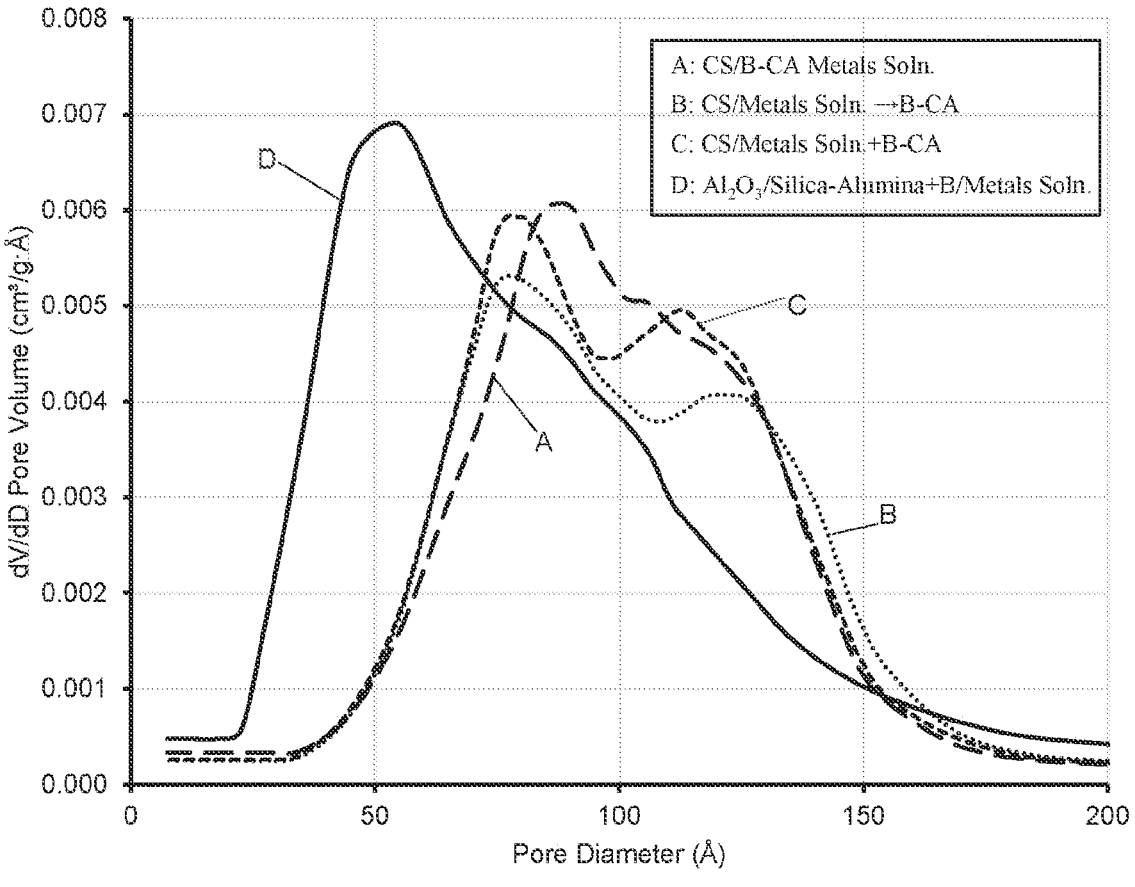
FIG. 7 illustrates pore size distributions of variously prepared supported catalysts.

The following Table 7 and FIG. 7 (Pore Size Distribution) summarize the characterization data of supported catalysts prepared according to the above alternative methods and those for Example 1 according to the inventive method herein.

TABLE 7

| | CS | CS/B—CA→Metals Soln. | CS/Metals Soln.→B—CA | CS/Metals Soln. + B—CA | Al₂O₃ + Silica-Alumina + B/Metals Soln. | CS/Metals Soln. |
|---|---|---|---|---|---|---|
| | | | Catalyst | | | |
| | | | Description | | | |
| | support base | boron, CA PVI on support, calcined, metals PVI, calcined | metals PVI on support, calcined, boron, CA PVI, calcined | metals, boron, CA PVI on support, calcined | boron added before support extruded, then calcined, metals PVI, calcined | metals PVI on support, then calcined (no boron) |
| | | | Reference | | | |
| | — | A | B | C | D | E |
| Metals MoO₃ (wt %) | 2.6 | 27.0 | 26.7 | 26.6 | 26.3 | 27.6 |
| CoO | 0 | 4.4 | 4.4 | 4.6 | 4.5 | 4.7 |
| NiO | 0.60 | 0.47 | 0.44 | 0.45 | 0.04 | 0.45 |
| P₂O₅ | 0.59 | 1.9 | 1.5 | 2.2 | 1.9 | 2.0 |
| SiO₂ | 2.1 | 1.5 | 1.5 | 1.4 | 1.4 | 1.6 |
| B₂O₃ | 0 | 2.0 | 1.9 | 0.73 | 1.3 | 0 |
| BET SA (m²/g) | 233 | 133 | 136 | 141 | 207 | 141 |
| N₂ PV (cc/g) | 0.77 | 0.43 | 0.43 | 0.45 | 0.40 | 0.44 |
| 4V/A (Å) | — | 129 | 126 | 128 | 78 | 125 |
| CBD (g/cc) | — | 0.84 | 0.83 | 0.80 | 0.74 | 0.82 |
| LOI (%) | 5.5 | 5.7 | 4.5 | 4.6 | 4.9 | 5.0 |

PVI = Pore Volume Impregnation;
CA = citric acid;
4V/A = average pore size

Activity data are presented in FIG. 8 and clearly demonstrate the advantages of the two-stage impregnation method of the present invention for boron incorporation. As can be observed, incorporation of boron using an indirect heat exchanger wherein the boron was incorporated in combination with the inorganic oxides prior to metals solution impregnation (Al₂O₃/silica-alumina+boron followed by metals solution impregnation and subsequent calcination, identified as D above) yielded a catalyst that exhibited about 6° F. better HDS activity compared to a baseline method in which the support was impregnated with a metals solution in the absence of boron (E) and then calcined. In contrast, a supported catalyst prepared according to the method of the present invention (CS/B+CA PVI on support; 1ˢᵗ stage calcination; metals PVI, 2ⁿᵈ stage calcination; identified as A above) and corresponding to Example 1 exhibited HDS activity that was about 12° F. better than the same baseline method. These results demonstrate that although boron enhances HDS activity, the specific means of accomplishing boron incorporation is crucial for maximizing the activity boost achieved by incorporating boron. Expressed in a different way, boron incorporation via impregnation yields improved activity than B incorporation directly in combination with the alumina support.

In terms of boron introduction through impregnation, referred to as pore volume impregnation (PVI), these results clearly show that the order of addition significantly affects activity. Again, the supported catalyst prepared according to the inventive method (CS/B+CA PVI on support; 1ˢᵗ stage calcination; metals PVI, 2ⁿᵈ a stage calcination) as exemplified in Example 1, exhibited about 12° F. better HDS activity relative to the baseline supported catalyst E. Reversal of the order of impregnation steps as in "B" (metals PVI on support, calcined, followed by boron and CA PVI, then calcined) led to a catalyst with no promotional effect relative to the baseline catalyst (in fact, referring to FIG. 8, a slight loss in activity in activity is observed relative to the baseline). Boron introduced via co-impregnation in "C" (metals, boron, CA PVI on support then calcined) exhibited a significant loss in activity of about 7° F.

Activity results for HDN followed similar trends; conditions 1-3 and "Overall" identified in the figure refer to the same conditions identified above and illustrated in the accompanying figures. Overall, method C resulted in no promotional effect relative to the baseline supported catalyst, supported catalyst according to method B exhibited an overall improvement of about 36%, and the catalyst according to method D, an overall improvement of about 27%. In contrast, the highest promotional effects were observed using the supported catalyst prepared in Example 1, in other words a supported catalyst prepared according to the inventive method disclosed herein (summarized as CS/B+CA PVI on support; 1ˢᵗ stage calcination; metals PVI, 2ⁿᵈ stage calcination, referred to as A above), which exhibited an overall improvement of about 65%.

Further comparative methods were evaluated and compared to the inventive method disclosed herein. Alternative Co and Mo-containing supported catalysts were prepared using different impregnation chemistries to further demonstrate the advantages of boron/carboxylic acid (specifically citric acid)-containing solutions.

F. CS/B—NH₃→Metals Solution PVI

The control inorganic oxide base (CS) was impregnated with a solution comprising boric acid dissolved in a basic ammonia solution. The resulting boron-containing intermediate was calcined using a "full burn" as described hereinabove. The resulting particles were pore volume impregnated using the same metals solution as described for the above examples and the resulting impregnated catalyst composition was calcined using a partial burn, also as described hereinabove. The composition and method are consistent with an alternative two-stage PVI method using ammonia for incorporating boron.

G. CS/B-CA→Modified Metals Solution (Zero-P)

In this example, the supported catalyst was prepared as in inventive Examples 1 and 2 above, with the notable exception that the Co and Mo-containing metals solution did not contain phosphoric acid. This example was selected to evaluate the effect of the absence of P on activity of the resulting supported catalyst.

Figure 9:
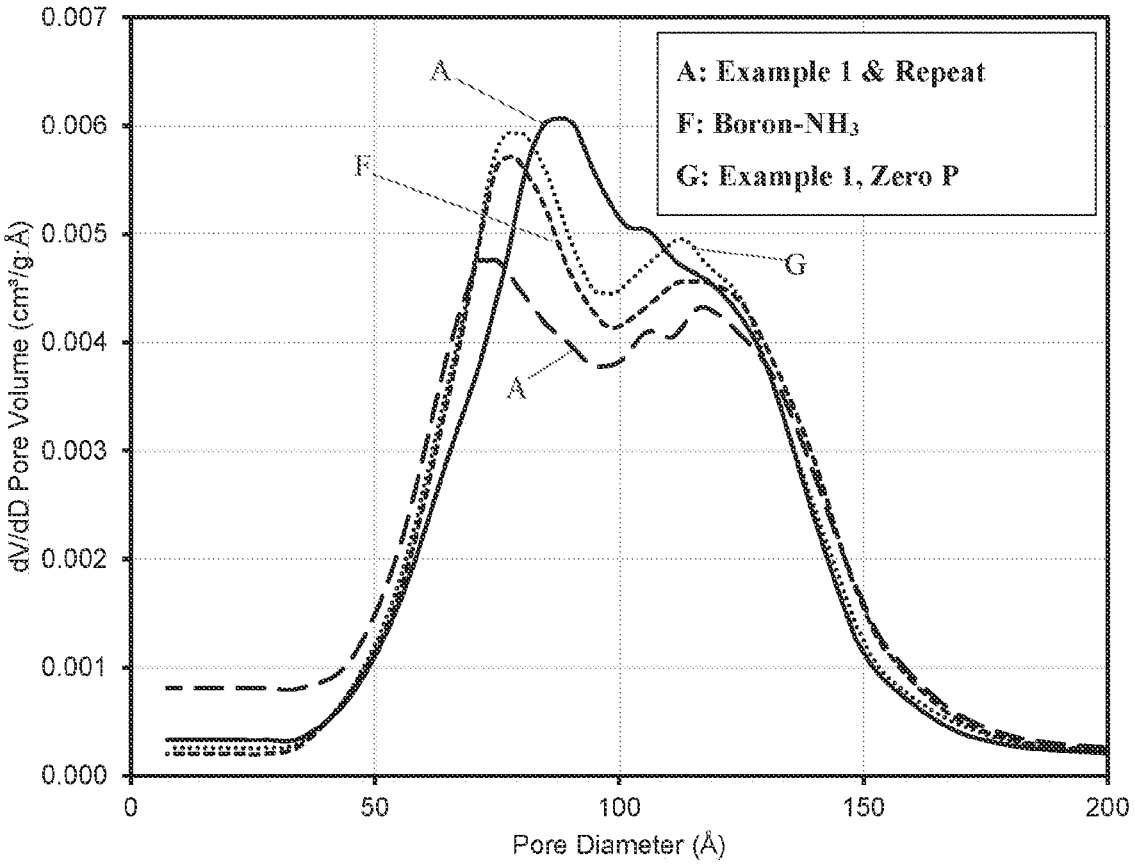
FIG. 9 illustrates the pore size distribution of variously prepared supported catalysts.

A summary of the characterization data of catalysts F and G is summarized in the following Table 8 and their pore size distributions are illustrated in FIG. 9.

Figure 11:
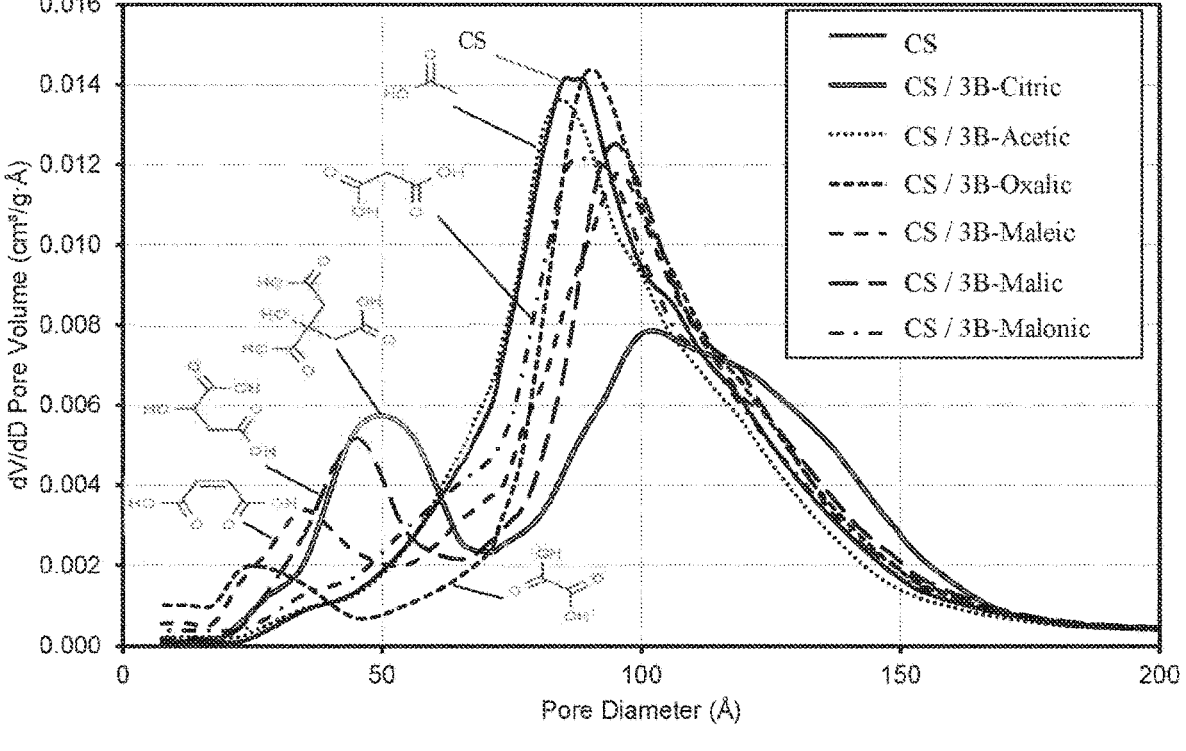
FIG. 11 illustrates pore size distributions of supported catalysts prepared according to the present invention using alternative carboxylic acids during the first-stage impregnation.

Boron-containing intermediates have been prepared to demonstrate that a wide variety of hydroxycarboxylic acids can be utilized to facilitate dispersion or dissolution of boron in an aqueous composition for first-stage impregnation. The following Table 9 and associated FIGS. 11 and 12 demonstrate that various mono- and di-carboxylic acids can be used to prepare useful boron impregnating compositions according to the inventive method, including citric, acetic, oxalic, maleic, malic and malonic acids. Additionally, $NH_4OH$, phosphoric acid and water per se have been tested. For most of these carboxylic acids, similar peaks at about 25 Å-50 Å can be observed in the pore size distribution curves following first-stage of impregnation and calcining; see FIG. 11.

TABLE 8

| | | | Catalyst | | |
|---|---|---|---|---|---|
| | CS | CS/ B—CA→Metals Soln. | CS/ B—CA→Metals Soln., Repeat Description | CS/ B—NH₃→Metals Soln. B/Ammonia | CS/ B—CA→Metals Soln., Zero-P |
| | support base | boron, CA PVI on support, calcined, metals PVI, calcined | boron, CA PVI on support, calcined, metals PVI, calcined Reference | boron, NH₃ PVI on support, calcined, metals PVI, calcined | boron, CA PVI on support, calcined, metals (zero P) PVI, calcined |
| | — | A | A | F | G |
| Metals (wt %) MoO₃ | 2.6 | 27.0 | 25.9 | 25.9 | 27.5 |
| CoO | 0 | 4.4 | 4.2 | 4.2 | 4.6 |
| P₂O₅ | 0.60 | 1.9 | 1.9 | 1.89 | 0.40 |
| SiO₂ | 0.59 | 1.5 | 1.4 | 1.4 | 1.4 |
| B₂O₃ | 2.1 | 2.0 | 2.0 | 2.0 | 2.1 |
| BET SA (m²/g) | 233 | 133 | 132 | 132 | 127 |
| N₂ PV (cc/g) | 0.77 | 0.43 | 0.44 | 0.44 | 0.42 |
| CBD (g/cc) | — | 0.84 | 0.84 | 0.80 | 0.80 |
| LOI (%) | 5.5 | 5.7 | 3.0 | 3.0 | 6.0 |

The performance of catalysts F and G were also evaluated compared to "baseline" reference supported catalyst E as in the above examples, and performance results are shown in FIG. 10. As can be observed, the two-stage PVI method for boron incorporation described herein is improved over the alternative method as described in F. Examples 1 and 2 outperformed comparable boron incorporation methods using ammonia to facilitate boron dissolution by about 10° F. for HDS. Furthermore, the formulation chemistry in Examples 1 and 2 containing P were about 5° F. better for HDS compared to a comparable method but in the absence of phosphorus. Similar trends were observed for HDN activity.

Alternative Organic Compounds

Additional research has been conducted regarding the utility of alternative organic compounds, such as chelates or chelating agents and modifiers for use in combination with the boron source for preparing the first-stage boron impregnation solution. As disclosed in the above examples, citric acid is particularly suitable, but other organic compounds are also useful, as disclosed hereinabove, and $NH_4OH$ has also been evaluated. The following examples present the results of such research.

TABLE 9

Examples of additional carboxylic acids and additives
for preparing the first-stage B-containing intermediate.
$CS/B_X—Y$
where X = $B_2O_3$ wt % target
Y = Additive/Organic Compound/Chelating Agent

| Sample | B₂O₃ Target (wt %) | BET SA (m²/g) | TPV (cc/g) | Particle Density (g/cc) |
|---|---|---|---|---|
| CS | 0 | 240 | 0.77 | 0.87 |
| CS/3B—H₂O | 3 | 234 | 0.73 | 0.89 |
| CS/3B—NH₄OH | 3 | 224 | 0.73 | 0.92 |
| CS/4B—NH₄OH | 4 | 233 | 0.74 | 0.91 |
| CS/3B-Citric Acid | 3 | 243 | 0.72 | 0.95 |
| CS/3B-Acetic Acid | 3 | 234 | 0.78 | 0.91 |
| CS/3B-Oxalic Acid | 3 | 264 | 0.74 | 0.89 |
| CS/3B-Maleic Acid | 3 | 270 | 0.73 | 0.91 |
| CS/3B-Malic Acid | 3 | 254 | 0.74 | 0.90 |
| CS/3B-Malonic Acid | 3 | 239 | 0.73 | 0.90 |

CS = Control support (alumina silica mixture, including recycled fines)

Figure 12:
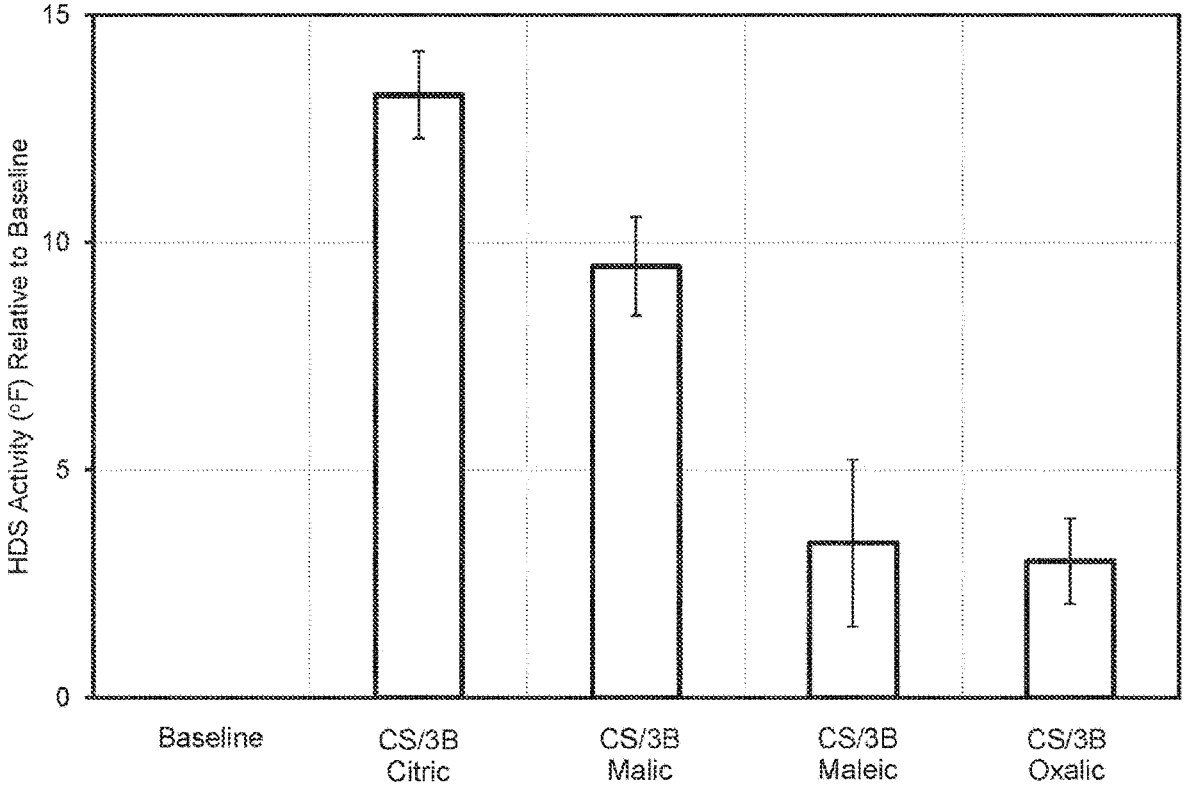
FIG. 12 illustrates the HDS activity of supported catalysts prepared according to the present invention using alternative carboxylic acids during the first-stage impregnation.

The HDS activity of supported catalysts prepared according to the invention disclosed herein and using, in the alternative, citric acid, malic acid, maleic acid and oxalic acid (as summarized in the above table) were compared to a baseline supported catalyst as shown in FIG. 12; pilot plant testing was as described above. The baseline supported catalyst was the same as reported above, i.e., a silica-alumina inorganic oxide support impregnated with a solution of the same catalytically active metals as the inventive catalysts (except without boron). As shown in FIG. 12, the inventive catalysts outperformed the baseline supported catalyst and furthermore, citric acid performed best.

Figure 13:
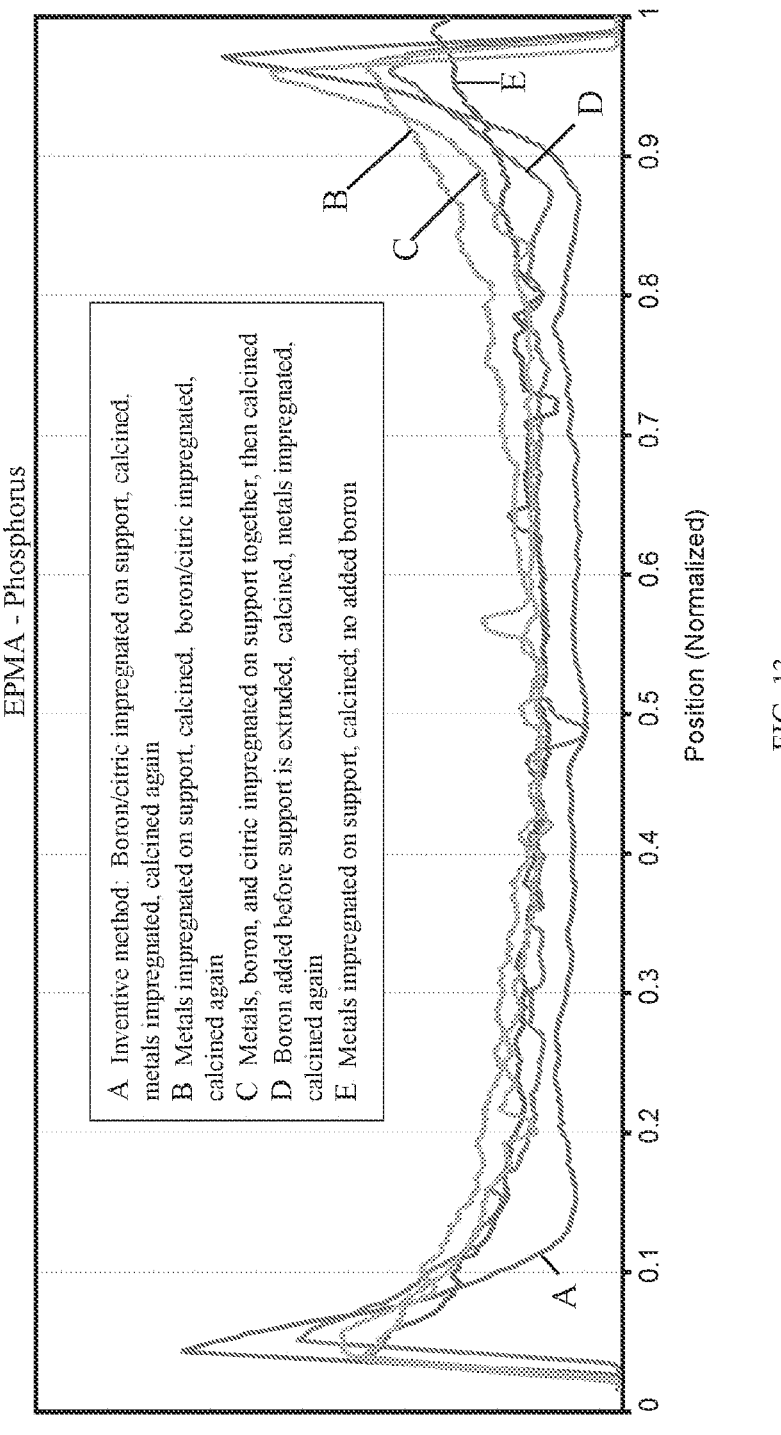
FIG. 13 illustrates EPMA scan results for phosphorus along the longitudinal cross-section of variously prepared supported catalyst particles.
Figure 14:
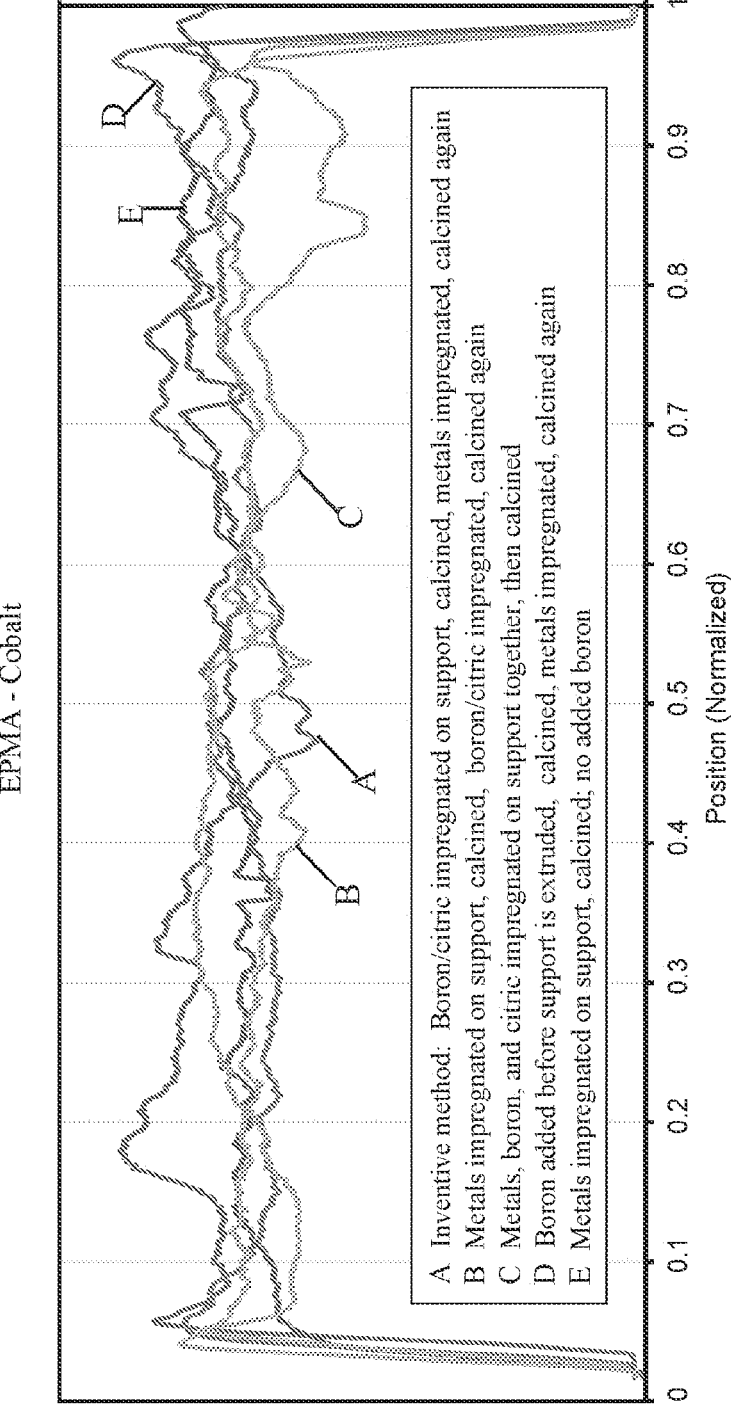
FIG. 14 illustrates EPMA scan results for cobalt along the longitudinal cross-section of variously prepared supported catalyst particles.

Examples A-E described hereinabove were evaluated using EPMA. The results are summarized in Table 10 below and illustrated in FIGS. 13-15, for phosphorus, cobalt and molybdenum, respectively; FIG. 16 illustrates scans for selected samples A, D and E (also as described in Tables 7 and 10), which are extracted from FIGS. 13-15 and are thus easier to read, but lead to the same conclusion.

TABLE 10

| | | | | Supported Catalyst | | | | | | | | | | |
|---|---|---|---|---|---|---|---|---|---|---|---|---|---|---|
| B/CA→Mo—Co Ni—P | | | Mo—Co Ni—P→B/CA | | | Mo—Co Ni—P + B/CA Description | | | Support + B/CA/ →Mo—Co Ni—P | | | Support + Mo—Co Ni—P | | |
| Inventive method: Boron/citric impregnated on support, calcined, metals impregnated, calcined again | | | Metals impregnated on support, calcined, boron/citric impregnated, calcined again | | | Metals, boron, and citric impregnated on support together, then calcined ** EPMA Reference | | | Boron added before support is extruded, calcined, metals impregnated, calcined again | | | Metals impregnated on support, then calcined. No B added | | |
| A | | | B | | | C | | | D | | | E | | |
| Amount Present in Each Section (wt %) | | | | | | | | | | | | | | |
| Position Across Extrudate (%) | | | | | | | | | | | | | | |
| MoO$_3$ | CoO | P$_2$O$_5$ | MoO$_3$ | CoO | P$_2$O$_5$ | MoO$_3$ | CoO | P$_2$O$_5$ | MoO$_3$ | CoO | P$_2$O$_5$ | MoO$_3$ | CoO | P$_2$O$_5$ |
| 0-33.3 | | | | | | | | | | | | | | |
| 10.2 | 1.5 | 0.8 | 9.0 | 1.5 | 0.6 | 9.1 | 1.6 | 0.9 | 8.9 | 1.4 | 0.8 | 8.0 | 1.4 | 0.8 |
| 33.3-66.6 | | | | | | | | | | | | | | |
| 6.8 | 1.5 | 0.4 | 8.6 | 1.5 | 0.4 | 9.5 | 1.7 | 0.6 | 7.4 | 1.6 | 0.5 | 9.5 | 1.6 | 0.5 |
| 66.6-100 | | | | | | | | | | | | | | |
| 10.0 | 1.5 | 0.7 | 9.1 | 1.5 | 0.6 | 8.0 | 1.3 | 0.8 | 10.0 | 1.6 | 0.6 | 10.1 | 1.7 | 0.7 |
| Amount Present in Each Section (%) | | | | | | | | | | | | | | |
| Position Across Extrudate (%) | | | | | | | | | | | | | | |
| MoO$_3$ | CoO | P$_2$O$_5$ | MoO$_3$ | CoO | P$_2$O$_5$ | MoO$_3$ | CoO | P$_2$O$_5$ | MoO$_3$ | CoO | P$_2$O$_5$ | MoO$_3$ | CoO | P$_2$O$_5$ |
| 0-33.3 | | | | | | | | | | | | | | |
| 38% | 34% | 42% | 34% | 33% | 37% | 34% | 34% | 39% | 34% | 31% | 40% | 29% | 30% | 38% |
| 33.3-66.6 | | | | | | | | | | | | | | |
| 25% | 33% | 20% | 32% | 34% | 25% | 36% | 38% | 26% | 28% | 35% | 26% | 34% | 34% | 26% |
| 66.6-100 | | | | | | | | | | | | | | |
| 37% | 33% | 38% | 34% | 33% | 38% | 30% | 28% | 35% | 38% | 34% | 24% | 36% | 36% | 36% |

Compositionally Distinguishing Characteristics

The novel method for producing a boron-containing supported catalyst as described hereinabove, also results in a surprising compositional difference for supported catalysts produced according to the disclosed method vis-à-vis supported catalysts produced by other methods.

Particles or pills (the extrudate) of supported boron-containing catalysts produced according to the present invention have been analyzed using an Electron Probe MicroAnalyzer (EPMA). The test method is described above and an exemplary test figure is shown in FIG. 2 and test results are discussed in Table 2. EPMA tests of the catalyst pills has demonstrated that boron addition according to the method disclosed herein affects how the catalytic metals and phosphorus distribute through the extrudate. Prior to the invention disclosed herein it was generally believed that metals or active catalyst components uniformly distributed throughout a supported catalyst pill would be preferred. However, surprisingly it has been confirmed using EPMA tests that improved performance of supported catalysts is obtained when catalysts are prepared according to the inventive method herein to produce a non-uniform distribution across the particle or pill; see, for example, performance data illustrated in FIG. 10 and summarized in the associated tables.

Rather than the metals and phosphorus being uniformly distributed throughout the pill, the distribution is inhomogeneous such that there is a greater concentration of the Group VIB metal or metals and phosphorus at and adjacent to the outer edges of the pill and a lower concentration in the central region of the pill.

The data in Table 10 and in the figures confirm that, unexpectedly, for supported catalyst prepared according to the inventive method disclosed herein compared to supported catalysts prepared according to the alternative or comparative methods, the concentrations of Mo and P are higher near the edges or outer one-third portions of the particle lobes than in the central one-third portion. However, the same inhomogeneity is not observed for Co. On the other hand, the unexpected and distinct concentration profiles are consistent with demonstrated improved catalyst performance also observed for supported catalysts prepared according to the inventive method disclosed herein.

Additional supported catalyst samples comprising tungsten and nickel as well as the other catalytic components as above were prepared according to the method disclosed herein and tested using EPMA. Catalyst characteristics, compositions and EPMA properties are summarized in following Tables 11-13 relative to control or comparative samples. The results are similar to those reported above, i.e., unique positional composition distributions for the Group VIB metals, including Mo and W as well as P, whereas the Group VIIIB metals Co and Ni did not exhibit the same response.

TABLE 11

Ni/Mo/(Co)/P Examples

| | Catalyst | |
|---|---|---|
| | B + CA→Mo—Co Ni—P | Support + Mo—Ni—P |
| | Description | |
| Metal Oxide | Inventive method: boron/citric impregnated on support/calcined/ metals, P impregnated/calcined Oxide (Wt %) | Metals, P impregnated on support/calcined (No B added) |
| MoO$_3$ | 25.68 | 25.81 |
| NiO | 5.55 | 6.21 |
| P$_2$O$_5$ | 6.04 | 7.03 |
| SiO$_2$ | 1.39 | 1.84 |
| B$_2$O$_3$ | 1.85 | 0 |
| BET SA (m$^2$/g) | 145 | 152 |
| N$_2$ PV (cc/g) | 0.37 | 0.38 |
| 4V/A (A) | 120 | 125 |
| CBD (g/cc) | 0.81 | 0.82 |
| LOI (%) | 5.9 | 7.3 |

TABLE 12

W/Ni/Mo/P Examples

| | Supported Catalyst* | |
|---|---|---|
| | B—→W—Ni—Mo—P | W—Ni—Mo—P |
| | Preparative Method | |
| Oxide | Inventive method: Boron/citric impregnated on support/calcined/metals impregnated/calcined Wt % | Comparative method: Metals impregnated on support/calcined (No B added) Wt % |
| MoO$_3$ | 11.47 | 10.80 |
| WO$_3$ | 19.43 | 18.75 |
| NiO | 5.75 | 5.62 |
| P$_2$O$_5$ | 4.59 | 4.35 |
| SiO$_2$ | 1.66 | 1.72 |
| B$_2$O$_3$ | 1.83 | 0 |

*Inorganic oxide support: Silica-alumina

TABLE 13

EPMA Distribution

| | Supported Catalyst* | | | | | | | |
|---|---|---|---|---|---|---|---|---|
| | B→W—Ni—Mo—P | | | | W—Ni—Mo—P | | | |
| | Preparative Method | | | | | | | |
| | Inventive method: Boron/citric impregnated on support/calcined/ metals impregnated/calcined | | | | Comparative Method: Metals impregnated on support/ calcined (No B added) | | | |
| Position Across Extrudate (%) | Amount Present in Each Section (wt %) | | | | | | | |
| | W | Ni | Mo | P | W | Ni | Mo | P |
| 0-33.3 | 7.2 | 1.8 | 4.4 | 2.0 | 5.6 | 1.8 | 3.4 | 1.7 |
| 33.3-66.6 | 4.3 | 1.9 | 2.4 | 0.7 | 6.4 | 2.0 | 3.6 | 0.8 |
| 66.6-100 | 7.1 | 2.0 | 4.5 | 1.7 | 5.9 | 1.9 | 3.5 | 1.8 |
| | Amount Present in Each Section (%) | | | | | | | |
| 0-33.3 | 37% | 32% | 39% | 44% | 30% | 32% | 32% | 39% |
| 33.3-66.6 | 22% | 33% | 21% | 15% | 34% | 35% | 33% | 17% |
| 66.6-100 | 37% | 36% | 40% | 38% | 32% | 33% | 33% | 42% |

*Inorganic oxide support: Silica-alumina

The following enumerated paragraphs represent various and alternative embodiments of the present invention:

1. A method of producing a supported catalyst, the method comprising:

(a) combining a porous inorganic oxide catalyst carrier or carrier extrudate with an aqueous solution, dispersion or suspension comprising:

(i) a boron-containing source; and (ii) an organic compound or organic chelating agent selected from organic compounds comprising at least two oxygen atoms and 2-10 carbon atoms;

to form a boron and organic compound-containing carrier composition and optionally extruding the composition to form an extrudate;

(b) calcining, or drying and calcining the composition or extrudate formed in (a) to reduce its volatiles content to a level of greater than 0 wt % to about 5 wt %, as measured by Loss on Ignition (LOI);

(c) impregnating the calcined composition formed in (b) with a solution, dispersion or suspension comprising at least one Group VIB metal-containing component or source and at least one Group VIIIB metal-containing component or source; and (d) calcining, or drying and calcining the composition formed pursuant to impregnating step (c) to reduce its volatiles content to a level as measured by Loss on Ignition (LOI) of greater than 0 wt % to less than about 30 wt %;

wherein (1) the amount of boron-containing source is sufficient to form a supported catalyst having a boron content in the range of about 1 wt % to about 13 wt %, expressed as boron oxide, B$_2$O$_3$, and based on the total weight of the catalyst; and (2) Loss on Ignition (LOI) is measured by subjecting a weighed sample to an oxygen-containing atmosphere for 1 hour at 1020° F. (548.9° C.) and measuring the loss in weight of the sample.

2. The method according to embodiment 1, wherein the boron content of the supported catalyst produced is in the range of about 1.5 wt % to about 6 wt %, expressed as boron oxide, B$_2$O$_3$, and based on the total weight of the catalyst.

3. The method according to embodiment 1 or embodiment 2, wherein the boron content of the supported catalyst produced is in the range of about 2 wt % to about 5 wt %, expressed as boron oxide, $B_2O_3$, and based on the total weight of the catalyst.

4. The method according to any one of embodiments 1 to 3, wherein the solution, dispersion or suspension in step (c) further comprises a phosphorus-containing source to provide a phosphorus content of the supported catalyst of about 0.5 wt % to about 10 wt %, expressed as an oxide, $P_2O_5$, and based on the total weight of the catalyst.

5. The method according to embodiment 4, wherein the amount of the phosphorus-containing source results in a phosphorus content of the supported catalyst in the range of about 0.5 wt % to about 5 wt % or about 4 wt % to about 10 wt %, expressed as an oxide, $P_2O_5$, and based on the total weight of the catalyst.

6. The method according to any one of embodiments 1-5, wherein the boron-containing source is selected from meta-boric acid ($HBO_2$), ortho-boric acid ($H_3BO_3$), ammonium borate tetra-hydrate $[(NH_4)_2B_4O_7 \cdot 4H_2O]$, sodium tetra borate, ammonium borate, ammonium tetra borate $[(NH_4)_2B_4O_7]$, boric oxide ($B_2O_3$), lithium tetraborate, mono-, di- or tri-alkyl amine borate, ammonium tetra phenyl borate, organic boron compounds and mixtures thereof.

7. The method according to any one of embodiments 1-6, wherein the organic compound or chelate is selected from organic compounds comprising at least two oxygen atoms and 2-10 carbon atoms, and the ethers, esters, acetals, acid chlorides, acid amides, oligomers or polymers thereof, and/or (ii) an organic compound comprising at least one covalently bonded nitrogen atom and at least one carbonyl moiety.

8. The method according to any one of embodiments 1-7, wherein the organic compound is selected from acetic acid, citric acid, tartaric acid, oxalic acid, maleic acid, malonic acid, malic acid, butanediol, pyruvic aldehyde, glycol aldehyde, acetaldol, tartaric acid, ethylene glycol, propylene glycol, glycerin, trimethylol ethane, trimethylol propane, diethylene glycol, dipropylene glycol, trimethylene glycol, triethylene glycol, tributylene glycol, tetraethylene glycol, tetrapentylene glycol, polyethylene glycol, ethylene glycol monobutyl ether, diethylene glycol monomethyl ether, diethylene glycol monoethyl ether, diethylene glycol monopropyl ether, and diethylene glycol monobutyl ether and mixtures thereof.

9. The method according to any one of embodiments 1-8, wherein the boron source comprises boric acid and the organic compound comprises citric acid.

10. The method according to any one of embodiments 1-9, wherein the solution, dispersion or suspension in step (c) comprises at least one organic chelating agent selected from: (i) an organic compound comprising at least two oxygen atoms and 2-10 carbon atoms, and the ethers, esters, acetals, acid chlorides, acid amides, oligomers or polymers thereof; and/or (ii) an organic compound comprising at least one covalently bonded nitrogen atom and at least one carbonyl moiety.

11. The method according to embodiment 10, comprising an organic chelating agent selected from acetic acid, citric acid, oxalic acid, maleic acid, malonic acid, malic acid, ethylene glycol and ammonium bicarbonate.

12. The method according to any one of embodiments 1-11, wherein the Loss on Ignition after step (b) is greater than 0 and to about 2 wt %.

13. The method according to any one of embodiments 1-12, wherein the catalyst exhibits a Loss on Ignition after step (d) of from about 3 to about 7 wt %.

14. The method according to any one of embodiments 1-13 wherein the porous inorganic oxide is selected from eta-, theta-, or gamma alumina and mixtures thereof, silica, silica-alumina, alumina with silica-alumina dispersed therein, silica-coated alumina, alumina-coated silica, magnesia, zirconia, titania, titania-alumina, and mixtures thereof.

15. A supported catalyst formed in accordance with any one of embodiments 1-14.

16. A method which comprises contacting a hydrocarbon feed with a supported catalyst according to embodiment 15, under hydrotreating conditions so as to hydrotreat the hydrocarbon feed.

17. A method of producing an inorganic oxide catalyst support, the method comprising:

(a) combining a porous inorganic oxide in particulate form with a composition comprising an aqueous solution, dispersion, or suspension comprising:

(1) a boron-containing source; and (2) an organic compound selected from the group consisting of compounds comprising at least two oxygen atoms and 2-10 carbon atoms; and (b) extruding the combination in (a) to form an extrudate;

(c) calcining or drying and calcining the extrudate to a dryness level measured by Loss on Ignition (LOI) of greater than 0 wt % to about 5 wt %;

wherein:

(i) the boron-containing source is present in an amount to provide a boron content in the range of about 1 wt % to about 13 wt %, expressed as boron oxide, $B_2O_3$ and based on the total weight of the support; and (ii) Loss on Ignition is measured by subjecting a weighed sample to an oxygen-containing atmosphere for 1 hour at 1020° F. (548.9° C.) and measuring the loss in weight.

18. The method according to embodiment 17, wherein the boron content of the support is in the range of about 1.5 wt % to about 6 wt %, expressed as an oxide, $B_2O_3$, and based on the total weight of the support.

19. The method according to embodiment 18, wherein the boron content of the catalyst support is in the range of about 2 wt % to about 5 wt %, expressed as an oxide, $B_2O_3$, and based on the total weight of the support.

20. The method according to any of embodiments 17-19, wherein in step (a):

(1) the boron-containing source is selected from meta-boric acid ($HBO_2$), ortho-boric acid ($H_3BO_3$), ammonium borate tetra-hydrate $[(NH_4)_2B_4O_7 \cdot 4H_2O]$, sodium tetra borate, ammonium borate, ammonium tetra borate $[(NH_4)_2B_4O_7]$, boric oxide ($B_2O_3$), lithium tetraborate, mono-, di- or tri-alkyl amine borate, ammonium tetra phenyl borate, organic boron compounds and mixtures thereof and the organic compound comprises citric acid; and (2) the organic compound or chelate is selected from organic compounds comprising at least two oxygen atoms and 2-10 carbon atoms, and the ethers, esters, acetals, acid chlorides, acid amides, oligomers or polymers thereof, and/or (ii) an organic compound comprising at least one covalently bonded nitrogen atom and at least one carbonyl moiety.

21. The method according to any of embodiments 17-20, wherein in step (a) the boron-containing source comprises boric acid and the organic compound or chelate comprises citric acid.

22. The method according to any one of embodiments 17-21 wherein the porous inorganic oxide is selected from eta-, theta-, or gamma alumina and mixtures thereof, silica, silica-alumina, alumina with silica-alumina dispersed therein, silica-coated alumina, alumina-coated silica, magnesia, zirconia, titania, titania-alumina, and mixtures thereof.

23. A supported hydroprocessing catalyst comprising:

a porous inorganic oxide catalyst carrier or catalyst support;

at least one Group VIB metal component in the form of an oxide;

at least one Group VIIIB metal component in the form of an oxide;

a boron-containing component in the form of an oxide, expressed as $B_2O_3$; and optionally a phosphorus component in the form of an oxide, expressed as $P_2O_5$; and wherein:

(a) the content of boron oxide is in the range of 1 to 13 wt %, based on the total weight of the catalyst;

(b) the content of the phosphorus component, when present, is about 0.5 wt %, based on the total weight of the catalyst, and wherein:

(1) the Group VIB and Group VIIIB metal components and phosphorus component and boron component are supported on and/or in a support or carrier comprising alumina or silica in the form of a pill having an internal cross-section and an outer surface; and (2) a position across the internal cross-section of the pill is identified by a percentage of the distance following a centerline from a first edge of the pill cross-section, designated as the starting point or 0% to the furthest edge of the pill cross-section, designated as 100%, along the centerline; and wherein:

(I) the concentration of the Group VIB metal oxide in the first 33⅓% or the last 33⅓% of the pill cross-section exceeds the concentration of the Group VIB metal oxide in the central 33⅓% of the pill cross-section by from about 20% to about 100%; and (II) the concentration of the Group VIB and Group VIIIB metal oxide components and phosphorus oxide component when present, across the cross section to the outer surface of the pill is determined using electron probe microanalysis.

24. The catalyst according to embodiment 23 wherein the Group VIB metal component is selected from an oxide of molybdenum tungsten or chromium.

25. The catalyst according to any one of embodiments 23 or 24 wherein the Group VIIIB metal component is selected from an oxide of cobalt or nickel.

26. The catalyst according to any one of embodiments 23 to 25, wherein the Group VIB metal component comprises molybdenum or tungsten.

27. The catalyst according to any one of embodiments 23 to 26 comprising phosphorus.

28. The catalyst according to embodiment 27 wherein the concentration of the phosphorus oxide in the first 33⅓% or the last 33⅓% of the pill cross-section exceeds the concentration of the phosphorus oxide in the central 33⅓ of the pill cross-section by from about 30% to about 350%.

29. The catalyst according to embodiment 27 or 28 wherein the amount of the phosphorus component is in the range of 4 wt % to 10 wt %, expressed as an oxide, $P_2O_5$, and based on the total weight of the catalyst.

30. The catalyst according to embodiment 29, wherein the amount of the phosphorus component is in the range of 4 wt % to 7 wt.

31. The catalyst according to embodiment 30, wherein the boron content in the range of 2 wt % to 8 wt %, expressed as an oxide, $B_2O_3$, and based on the total weight of the catalyst.

32. The catalyst according to embodiment 31, wherein the boron content in the range of 4 wt % to 6 wt %.

33. The catalyst according any one of embodiments 23 to 32, wherein the carrier comprises alumina.

34. The catalyst according to any one of embodiments 23 to 33, wherein the boron source comprises boric acid.

35. The catalyst according to any one of embodiments 23 to 34, further comprising an organic additive.

36. The catalyst according to embodiment 35, wherein the organic additive is selected from: (i) an organic compound comprising at least two oxygen atoms and 2-10 carbon atoms, and the ethers, esters, acetals, acid chlorides, acid amides, oligomers or polymers thereof, and/or (ii) an organic compound comprising at least one covalently bonded nitrogen atom and at least one carbonyl moiety.

37. The catalyst according to any one of the preceding embodiments wherein the porous inorganic oxide is selected from eta-, theta-, or gamma alumina and mixtures thereof, silica, silica-alumina, alumina with silica-alumina dispersed therein, silica-coated alumina, alumina-coated silica, magnesia, zirconia, titania, titania-alumina, and mixtures thereof.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed:

$$R=R_L+k(R_U-R_L),$$

wherein k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above is also specifically disclosed.

The invention claimed is:

1. A method of producing a supported catalyst, the method comprising:

(a) combining a porous inorganic oxide catalyst carrier or carrier extrudate with an aqueous solution, dispersion or suspension comprising:

(i) a boron-containing source; and (ii) an organic compound or organic chelating agent selected from organic compounds comprising at least two oxygen atoms and 2-10 carbon atoms;

to form a boron and organic compound-containing carrier composition and optionally extruding the composition to form an extrudate;

(b) calcining, or drying and calcining the composition or extrudate formed in (a) to reduce its volatiles content to a level of greater than 0 wt % to about 5 wt %, as measured by Loss on Ignition (LOI);

(c) impregnating the calcined composition formed in (b) with a solution, dispersion or suspension comprising at least one Group VIB metal-containing component or source and at least one Group VIIIB metal-containing component or source; and (d) calcining, or drying and calcining the composition formed pursuant to impregnating step (c) to reduce its volatiles content to a level as measured by Loss on Ignition (LOI) of greater than 0 wt % to less than 30 wt %;

wherein (1) the amount of boron-containing source is sufficient to form a supported catalyst having a boron content in the range of about 1 wt % to about 13 wt %, expressed as boron oxide, $B_2O_3$, and based on the total weight of the catalyst; and (2) Loss on Ignition (LOI) is measured by subjecting a weighed sample to an oxygen-containing atmosphere for 1 hour at 1020° F. (548.9° C.) and measuring the loss in weight of the sample.

2. The method according to claim 1, wherein the boron content of the supported catalyst produced is in the range of about 1.5 wt % to about 6 wt %, expressed as boron oxide, $B_2O_3$, and based on the total weight of the catalyst.

3. The method of claim 1, wherein the solution, dispersion or suspension in step (c) further comprises a phosphorus-containing source to provide a phosphorus content of the supported catalyst of about 0.5 wt % to about 10 wt %, expressed as an oxide, $P_2O_5$, and based on the total weight of the catalyst.

4. The method of claim 1, wherein the boron-containing source is selected from meta-boric acid ($HBO_2$), ortho-boric acid ($H_3BO_3$), ammonium borate tetra-hydrate [$(NH_4)$ $2B_4O_7\cdot4H_2O$], sodium tetra borate, ammonium borate, ammonium tetra borate [$(NH_4)2B_4O_7$], boric oxide ($B_2O_3$), lithium tetraborate, mono-, di- or tri-alkyl amine borate, ammonium tetra phenyl borate, organic boron compounds and mixtures thereof.

5. The method of claim 1, wherein the organic compound or organic chelating agent is selected from organic compounds comprising at least two oxygen atoms and 2-10 carbon atoms, and the ethers, esters, acetals, acid chlorides, acid amides, oligomers or polymers thereof, and/or (ii) an organic compound comprising at least one covalently bonded nitrogen atom and at least one carbonyl moiety.

6. The method of claim 1, wherein the organic compound is selected from acetic acid, citric acid, tartaric acid, oxalic acid, maleic acid, malonic acid, malic acid, butanediol, pyruvic aldehyde, glycol aldehyde, acetaldol, tartaric acid, ethylene glycol, propylene glycol, glycerin, trimethylol ethane, trimethylol propane, diethylene glycol, dipropylene glycol, trimethylene glycol, triethylene glycol, tributylene glycol, tetraethylene glycol, tetrapentylene glycol, polyethylene glycol, ethylene glycol monobutyl ether, diethylene glycol monomethyl ether, diethylene glycol monoethyl ether, diethylene glycol monopropyl ether, and diethylene glycol monobutyl ether and mixtures thereof.

7. The method of claim 1, wherein the Loss on Ignition after step (b) is greater than 0 and to about 2 wt %.

8. The method of claim 1 wherein the porous inorganic oxide catalyst carrier is selected from eta-, theta-, or gamma alumina and mixtures thereof, silica, silica-alumina, alumina with silica-alumina dispersed therein, silica-coated alumina, alumina-coated silica, magnesia, zirconia, titania, titania-alumina, and mixtures thereof.

9. A supported catalyst formed in accordance to claim 1.

10. A method which comprises contacting a hydrocarbon feed with a supported catalyst according to claim 9, under hydrotreating conditions so as to hydrotreat the hydrocarbon feed.

11. A method of producing an inorganic oxide catalyst support, the method comprising:

(a) combining a porous inorganic oxide in particulate form with a composition comprising an aqueous solution, dispersion, or suspension comprising:

(1) a boron-containing source; and (2) an organic compound selected from the group consisting of compounds comprising at least two oxygen atoms and 2-10 carbon atoms; and (b) extruding the combination in (a) to form an extrudate;

(c) calcining or drying and calcining the extrudate to a dryness level measured by Loss on Ignition (LOI) of greater than 0 wt % to about 5 wt %;

wherein:

(i) the boron-containing source is present in an amount to provide a boron content in the range of about 1 wt % to about 13 wt %, expressed as boron oxide, $B_2O_3$ and based on the total weight of the support; and (ii) Loss on Ignition is measured by subjecting a weighed sample to an oxygen-containing atmosphere for 1 hour at 1020 of (548.9° C.) and measuring the loss in weight.

12. The method according to claim 11, wherein the boron content of the support is in the range of about 1.5 wt % to about 6 wt %, expressed as an oxide, $B_2O_3$, and based on the total weight of the support or wherein the porous inorganic oxide is selected from eta-, theta-, or gamma alumina and mixtures thereof, silica, silica-alumina, alumina with silica-alumina dispersed therein, silica-coated alumina, alumina-coated silica, magnesia, zirconia, titania, titania-alumina, and mixtures thereof.

13. The method of claim 11, wherein in step (a):

(1) the boron-containing source is selected from meta-boric acid ($HBO_2$), ortho-boric acid ($H_3BO_3$), ammonium borate tetra-hydrate [$(NH_4)2B_4O_7\cdot4H_2O$], sodium tetra borate, ammonium borate, ammonium tetra borate [$(NH_4)2B_4O_7$], boric oxide ($B_2O_3$), lithium tetraborate, mono-, di- or tri-alkyl amine borate, ammonium tetra phenyl borate, organic boron compounds and mixtures thereof and the organic compound comprises citric acid; and (2) the organic compound is selected from organic compounds comprising at least two oxygen atoms and 2-10 carbon atoms, and the ethers, esters, acetals, acid chlorides, acid amides, oligomers or polymers thereof, and/or (ii) an organic compound comprising at least one covalently bonded nitrogen atom and at least one carbonyl moiety.

14. A supported hydroprocessing catalyst comprising:

a porous inorganic oxide catalyst carrier or catalyst support;

at least one Group VIB metal component in the form of an oxide;

at least one Group VIIIB metal component in the form of an oxide;

a boron-containing component in the form of an oxide, expressed as $B_2O_3$; and optionally a phosphorus component in the form of an oxide, expressed as $P_2O_5$; and wherein:

(a) the content of boron oxide is in the range of 1 to 13 wt %, based on the total weight of the catalyst;

(b) the content of the phosphorus component, when present, is at least 0.5 wt %, based on the total weight of the catalyst, and wherein:

(1) the Group VIB and Group VIIIB metal components and phosphorus component, when present and boron component are supported on and/or in a support or carrier comprising alumina or silica in the form of a pill having an internal cross-section and an outer surface; and (2) a position across the internal cross-section of the pill is identified by a percentage of the distance following a centerline from a first edge of the pill cross-section, designated as the starting point or 0% to the furthest edge of the pill cross-section, designated as 100%, along the centerline; and wherein:

(I) the concentration of the Group VIB metal oxide in the first 33⅓% or the last 33⅓% of the pill cross-section exceeds the concentration of the Group VIB metal oxide in the central 33⅓% of the pill cross-section by from about 20% to about 100%; and (II) the concentration of the Group VIB and Group VIIIB metal oxide components and phosphorus oxide component when present, across the cross section to the outer surface of the pill is determined using electron probe microanalysis.

15. The catalyst according to claim 14 wherein:

(i) the Group VIB metal component is selected from an oxide of molybdenum, tungsten, or chromium;

(ii) the Group VIIIB metal component is selected from an oxide of cobalt or nickel; or (iii) the Group VIB metal component comprises molybdenum or tungsten.

16. The catalyst of claim 14, wherein the catalyst further comprises phosphorus, and (i) wherein the concentration of the phosphorus oxide in the first 33⅓% or the last 33⅓% of the pill cross-section exceeds the concentration of the phosphorus oxide in the central 33⅓ of the pill cross-section by from about 30% to about 350%; or (ii) wherein the amount of the phosphorus component is in the range of 4 wt % to 10 wt %, expressed as an oxide, $P_2O_5$, and based on the total weight of the catalyst.

17. The catalyst of claim 14, wherein the boron content in the range of 2 wt % to 8 wt %, expressed as an oxide, $B_2O_3$, and based on the total weight of the catalyst.

18. The catalyst of claim 14, wherein the carrier comprises alumina.

19. The catalyst of claim 14, further comprising an organic additive selected from: (i) an organic compound comprising at least two oxygen atoms and 2 to 10 carbon atoms, and the ethers, esters, acetals, acid chlorides, acid amides, oligomers or polymers thereof; and/or (ii) an organic compound comprising at least one covalently bonded nitrogen atom and at least one carbonyl moiety.

20. The catalyst of claim 14, wherein the porous inorganic oxide catalyst carrier or catalyst support is selected from eta-, theta-, or gamma alumina and mixtures thereof, silica, silica-alumina, alumina with silica-alumina dispersed therein, silica-coated alumina, alumina-coated silica, magnesia, zirconia, titania, titania-alumina, and mixtures thereof.

\* \* \* \* \*